United States Patent
Jameson et al.

(10) Patent No.: US 6,368,444 B1
(45) Date of Patent: Apr. 9, 2002

(54) APPARATUS AND METHOD FOR CROSS-DIRECTIONAL STRETCHING OF POLYMERIC FILM AND OTHER NONWOVEN SHEET MATERIAL AND MATERIALS PRODUCED THEREFROM

(75) Inventors: Lee Kirby Jameson, Roswell, GA (US); Diane Leilani Kilpatrick, Bryan, TX (US); Paul Windsor Estey, Cumming, GA (US); James Russell Fitts, Jr., Gainesville, GA (US); Darryl Franklin Clark; James Richard Neely, both of Alpharetta, GA (US); Ty Jackson Stokes, Suwanee, GA (US); Robert John Schwartz, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/428,064

(22) Filed: Oct. 27, 1999

Related U.S. Application Data

(60) Provisional application No. 60/108,733, filed on Nov. 17, 1998.

(51) Int. Cl.$^7$ ............................................. B32B 31/00
(52) U.S. Cl. ..................... 156/229; 156/324; 156/496; 264/288.8
(58) Field of Search ................. 156/229, 324, 156/494, 495, 496, 555, 582; 264/288.4, 288.8

(56) References Cited

U.S. PATENT DOCUMENTS

| | | | |
|---|---|---|---|
| 3,233,029 A | 2/1966 | Rasmussen et al. | 264/288 |
| 3,338,992 A | 8/1967 | Kinney | 264/24 |
| 3,341,394 A | 9/1967 | Kinney | 161/72 |
| 3,383,449 A | 5/1968 | Müller | 264/287 |
| 3,542,615 A | 11/1970 | Dobo et al. | 156/181 |
| 3,692,618 A | 9/1972 | Dorschner et al. | 161/72 |
| 3,802,817 A | 4/1974 | Matsuki et al. | 425/66 |
| 3,844,865 A | 10/1974 | Elton et al. | 156/229 |
| 3,849,241 A | 11/1974 | Butin et al. | 161/169 |
| 3,849,526 A | 11/1974 | Müller et al. | 264/286 |
| 3,854,418 A | 12/1974 | Bertin | 105/29 R |
| 4,000,242 A | 12/1976 | Hartbauer | 264/284 |
| 4,041,203 A | 8/1977 | Brock et al. | 428/157 |

(List continued on next page.)

FOREIGN PATENT DOCUMENTS

| | | | |
|---|---|---|---|
| EP | 0276100 A1 | 7/1988 | B29C/55/18 |
| GB | 1327459 | 8/1973 | D04H/13/00 |
| JP | 7329386 | 2/1968 | |
| JP | 90/03464 | 4/1990 | |
| WO | 95/16562 | 6/1995 | |
| WO | 98/04397 | 2/1998 | |
| WO | 98/28134 | 7/1998 | |

OTHER PUBLICATIONS

NRL Report 4364, "Manufacture of Super–Fine Organic Fibers" by B. A. Wendt, E. L. Boone and D. D. Fluharty.
NRL Report 5265, "An Improved Device For The Formation of Super–Fine Thermoplastic Fibers" by K. D. Lawrence, R. T. Lukas, and J. A. Young.

Primary Examiner—James Sells
(74) Attorney, Agent, or Firm—Steven D. Flack

(57) ABSTRACT

A method for stretching nonwoven sheet material in the cross-machine direction includes coursing a nonwoven sheet material through a deformable nip, the nip being formed between two rotating stretch surfaces having intermeshing peaks and troughs, the surfaces of the peaks and troughs being covered with a deformable material, and contemporaneously pressing the stretch surfaces together while rotating them, such that as the nonwoven material travels through the nip, the nip deforms from an initial flat formation into a convoluted formation.

7 Claims, 13 Drawing Sheets

U.S. PATENT DOCUMENTS

| | | | |
|---|---|---|---|
| 4,107,361 A | 8/1978 | Parker | 428/17 |
| 4,116,892 A | 9/1978 | Schwarz | 521/62 |
| 4,151,245 A | 4/1979 | Suzuki | 264/288 |
| 4,152,389 A | 5/1979 | Miller | 264/284 |
| 4,153,664 A | 5/1979 | Sabee | 264/289 |
| 4,153,751 A | 5/1979 | Schwarz | 428/304 |
| 4,211,743 A | 7/1980 | Nauta et al. | 264/284 |
| 4,223,059 A | 9/1980 | Schwarz | 428/198 |
| 4,289,832 A | 9/1981 | Schwarz | 428/542 |
| 4,327,467 A | 5/1982 | Quaint | 29/113 R |
| 4,340,563 A | 7/1982 | Appel et al. | 264/518 |
| 4,350,655 A | 9/1982 | Hoge | 264/145 |
| 4,379,192 A | 4/1983 | Wahlquist et al. | 428/156 |
| 4,438,167 A | 3/1984 | Schwarz | 428/138 |
| 4,472,328 A | 9/1984 | Sugimoto et al. | 264/41 |
| 4,517,714 A | 5/1985 | Sneed et al. | 28/103 |
| 4,531,996 A * | 7/1985 | Sukenik | 156/472 |
| 4,558,725 A | 12/1985 | Veneziale | 144/362 |
| 4,563,229 A | 1/1986 | Sorez | 156/64 |
| 4,662,863 A | 5/1987 | Sloniewsky et al. | 474/251 |
| 4,806,300 A | 2/1989 | Walton et al. | 264/288.8 |
| 4,820,249 A * | 4/1989 | Wech | 493/192 |
| 4,867,881 A | 9/1989 | Kinzer | 210/490 |
| 4,877,679 A | 10/1989 | Leatherman et al. | 428/224 |
| 4,919,738 A * | 4/1990 | Ball et al. | 156/73.5 |
| 5,028,289 A | 7/1991 | Rasmussen | 156/229 |
| 5,064,802 A | 11/1991 | Stevens et al. | 502/155 |
| 5,089,075 A | 2/1992 | Sonoda | 156/244.18 |
| 5,120,594 A | 6/1992 | Mrozinski | 428/195 |
| 5,156,793 A | 10/1992 | Buell et al. | 264/288.8 |
| 5,238,623 A | 8/1993 | Mrozinski | 264/48 |
| 5,296,184 A | 3/1994 | Wu et al. | 264/154 |
| 5,374,696 A | 12/1994 | Rosen et al. | 526/126 |
| 5,382,461 A | 1/1995 | Wu | 428/86 |
| 5,424,025 A | 6/1995 | Hanschen et al. | 264/288.8 |
| RE35,206 E | 4/1996 | Hassenboehler et al. | 55/528 |
| 5,569,232 A | 10/1996 | Roe et al. | 604/385.2 |
| 5,651,853 A | 7/1997 | Wrigley et al. | 156/290 |
| 5,665,083 A | 9/1997 | Igaue et al. | 604/370 |
| 5,758,842 A | 6/1998 | Dorfel et al. | 242/542 |
| 5,779,965 A | 7/1998 | Beuther et al. | 264/280 |
| 5,791,242 A | 8/1998 | Kayser et al. | 100/331 |
| 5,792,404 A | 8/1998 | Cree et al. | 264/134 |
| 5,814,390 A | 9/1998 | Stokes et al. | 428/181 |

* cited by examiner

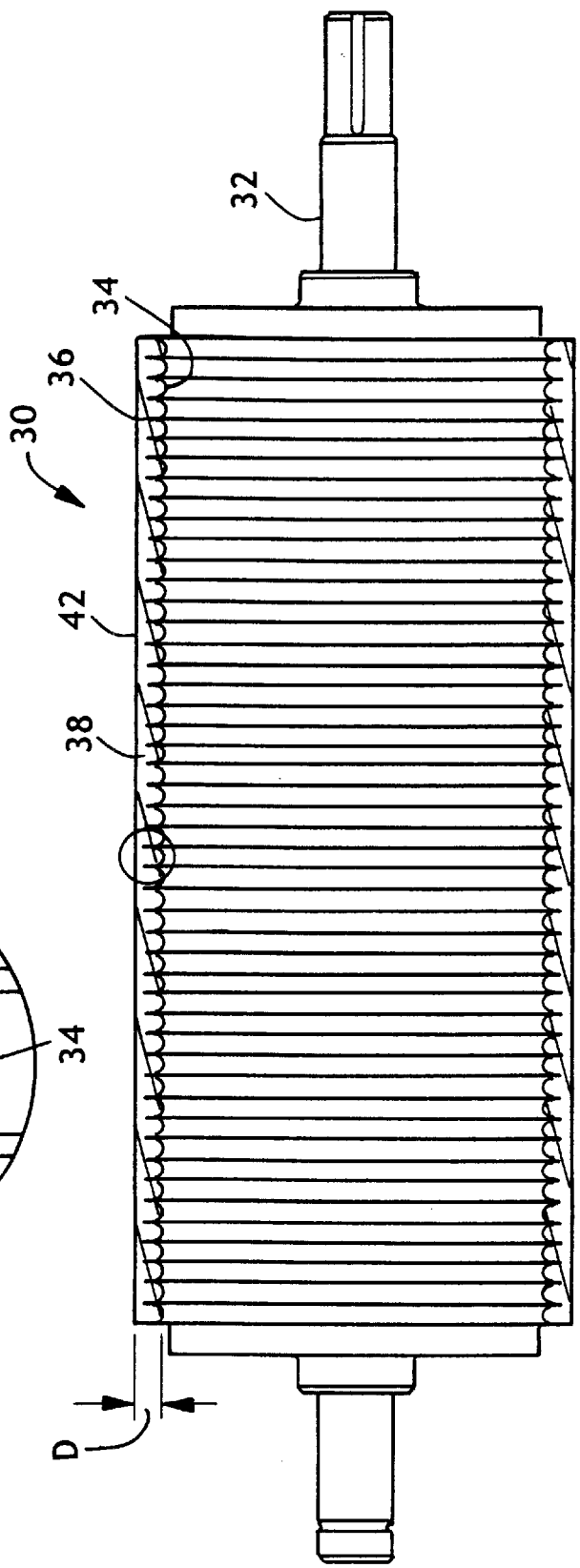
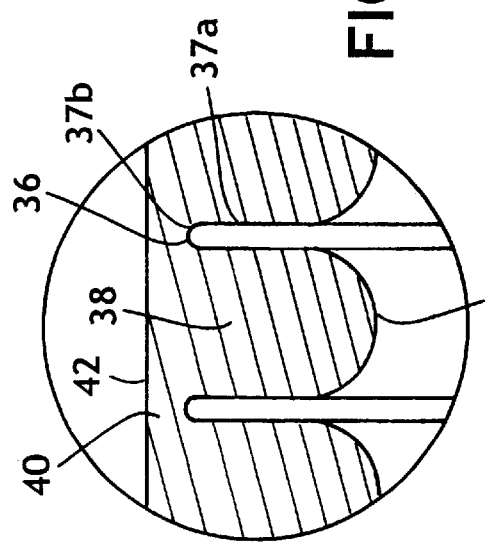
FIG. 3
FIG. 2

APPARATUS AND METHOD FOR CROSS-DIRECTIONAL STRETCHING OF POLYMERIC FILM AND OTHER NONWOVEN SHEET MATERIAL AND MATERIALS PRODUCED THEREFROM

This application claim benefit to provisional No. 60/108,733 filed Nov. 17, 1998

FIELD OF THE INVENTION

The present invention is generally directed to an apparatus and method for biaxially stretching extensible polymeric films and nonwoven webs in the cross-machine and machine directions, and the material produced therefrom. More particularly, the present invention relates to an apparatus and methods for biaxially stretching films and nonwoven webs in the cross-machine and machine directions while reducing the levels of variability in stretch.

BACKGROUND OF THE INVENTION

Polymeric nonwoven webs, films and laminates made therefrom exhibit properties which make them especially suitable for use in personal care products. For example, such materials may be used as outer covers for personal care products such as diapers, training pants, incontinence garments, and feminine hygiene products. Additionally, such materials are particularly suited for use in protective outer wear such as coveralls, surgical garments, and face masks.

In particular, film laminates have become an important article in commerce, finding a wide variety of uses. Such laminates have been used in personal care products to create soft, barriers that provide stretch. The ability to "give without rupture" and in some instances "stretch," allows for body conformance by these products.

While a variety of film laminates are known in the art, a particularly useful film laminate includes a breathable barrier. Breathable barriers can comprise stretch-filled microporous film or non-filled microporous film layers. Stretch-filled microporous films are typically filled with particles or other matter and then crushed or stretched to form a fine pore network throughout the film. The pores result when the polymers in the film separate from the particle filler. This film-pore network allows gas and water vapor to pass through the film while acting as a barrier to liquids and particulate matter. The amount of filler within the film and the degree of stretching is controlled so as to create a network of micropores of a size and frequency to impart the desired level of breathability to a fabric. An exemplary stretched filled film is described in commonly assigned WO Patent Application 95/16562 to McCormack. The McCormack reference discloses a stretched filled film comprising a predominantly linear polyolefin polymer, a bonding agent and about 30 to 80% by weight calcium carbonate which can be stretched to impart breathability to the film. The stretched film may then be laminated to a nonwoven web to create a laminate that takes advantage of the strength, integrity and cloth-like aesthetics of the nonwoven web and the barrier properties of the stretched film.

Providing a low cost film lamination method that achieves both a desired level of conformance and breathability is problematic, particularly when laminating stretch-filled films. In order to achieve acceptable body conformance, the lamination method should impart good stretch (that is effective stretch with limited variability) properties, and must also be able to allow for the formation and retention of the micropores upon processing. The pores must be capable of being stretched to an extent that they remain open and yet are not enlarged to the level that would allow liquid or particulate matter to pass.

Another particularly useful laminate including a breathable barrier includes a non-filled microporous film. While a nonwoven web can be laminated to a non-filled microporous film, in order to obtain a laminate with cross-directional stretch (CD) and machine direction stretch (MD), the nonwoven web must often be separately stretched in each direction.

In order to achieve MD and CD stretch in laminates including monolithic films (that is nonporous films), the film must be separately stretched in each direction during the manufacturing process.

It has been recognized that to enhance a personal care product's ability to conform to the body, nonwoven webs and films (and laminates thereof) which make up the personal care product are separately stretched in the CD and MD directions during manufacture, to create breathable low density/low basis weight fabric with stretch in multiple directions. A technique which has been used to stretch nonwoven webs and films in multiple directions, includes passing these sheet materials through multiple sets of intermeshing rolls. In this regard, a sheet of nonwoven web or film is fed through a series of nips formed between multiple sets of intermeshing rolls. The rolls typically have intermeshing peaks and troughs along their respective surfaces or are made of removable intermeshing disks stacked laterally along the length of axles. As the nonwoven web or film is coursed between the sets of rotating rolls, the rolls are brought together in a mating fashion, thereby forcing the surfaces of the rolls to intermesh. As a result, the material is clamped by multiple incremental nips formed between the intermeshing regions of the two rolls. The rotation of one or both of the intermeshing rolls (in opposing directions) pulls the material through the set of rolls.

As the nonwoven web or film travels between the intermeshed areas on the rolls, it is stretched by the increments between the peaks (or disks, as the case may be). This incremental stretching, as shown in FIG. 1, produces zones of variable stretch on the nonwoven web or film sheet. A machine direction, partial cross-sectional view of a nonwoven web 20 being coursed through prior art intermeshed rolls is shown in FIG. 1. The nonwoven web 20 has discrete stretch points 21 between unstretched regions 22. The stretch points 21 occur at the extended points 23 on the peaks of the rolls' surfaces. The material is held taut between each of these peaks and stretched. This variable stretching often leads to weakening of the nonwoven material in these regions, and ultimately to material failure. In many instances, the surface of the rolls act as slitters if they are operated at high speed, with the edges of the peaks or disks piercing the nonwoven material.

Rolls with intermeshing surface troughs perpendicular to the rolls' longitudinal axis, or that are made of stacked disks, will stretch nonwoven material in the CD direction. Rolls with intermeshing surface troughs that are parallel to the rolls' longitudinal axis will stretch this material in the MD direction. In order to stretch biaxially, that is in both the CD and MD directions, the nonwoven material must be coursed through consecutive pairs of rolls with a first pair of rolls having troughs perpendicular to those of the second set. Therefore, biaxial stretching has heretofore required an extended production line.

In using intermeshed rolls to stretch microporous film, the film pores may not sufficiently be opened to maintain their porosity through a later lamination step. In elastic films, the pores often collapse. As a result, it is often difficult to obtain adequate stretching or pore formation over the entire width of a film sheet without rupturing the sheet. If less variability in stretch is desired to achieve high breathability, the film sheet must be run through sets of rolls multiple times. Even with repetitive rolling however, such rolls fail to allow for targeted stretching in discrete regions on the film material.

Other methods for stretching an impregnated film to produce a microporous product include the concomitant controlling of the velocity of the film introduction into a nip of troughed rolls to substantially the identical velocity of the surface velocity of the rolls. This technique, disclosed in U.S. Pat. No. 4,153,751 to Schwarz for the creation of microporous film, is best accomplished by numerous runs to achieve a desired draw. If only one pass of film is run, it is likely that the pores formed around the film filler will be oblong in shape. As a result, such pores may collapse during a later lamination step.

In order to create a nonwoven web with enhanced stretch, softness and drapability, and with lower basis weight, the shapes and sizes of the troughs on intermeshing rolls have been varied. For instance, roll peaks and troughs have been toothlike in shape, as exemplified by U.S. Pat. No. 4,153,664 to Sabee, or sinusoidal, as described in U.S. Pat. No. 5,028,289 to Rasmussen. While use of such intermeshing rolls produces a fabric having a pattern of spaced apart undrawn shaped islands in the fibers of the sheet material, the fabric stretch varies greatly by regions on the sheet. Fibers of such webs contain thick and thin zones. Therefore, while varying the shape and incline of the peaks may help in lengthening the areas of stretch on the nonwoven web material, the overall stretching varies by region.

In an effort to create CD stretching with more uniform incremental stretching, the sinusoidal peaks and troughs of rolls have been manufactured of a deformable material such as rubber. U.S. Pat. No. 4,806,300 to Walton et al. describes intermeshing rolls with a sinusoidal cross-sectional surface profile formed from circumferential rubber peaks and troughs at the surface of the rolls. However, the stretching at the incremental nips between such rolls also varies by zone. It is likely that at high speeds, the rubber peaks of such rolls would disintegrate from frictional forces. In order to achieve stretching in both the machine and cross-machine direction with such rolls, it is also necessary to run material through a series of such roll sets.

Other methods for stretching a nonwoven sheet material include the use of clamp systems such as tenter frames. However, clamp systems pose efficiency and practical limitations which make their use on an extended, high volume production line difficult.

In an effort to reduce the deformation of a nonwoven web that occurs during lamination, the non-engraved anvil roll of a thermal point bonding roll set (as opposed to the patterned roll) has been covered with rubber, such as a rubber sleeve, in order to create a larger area over which a constant nipping force is distributed. As disclosed in WO 98/28134 to Jones et al., the modified anvil roll does not provide for zoned stretching or zoned breathability of a nonwoven material, or biaxial stretching of a nonwoven material.

Therefore, despite the developments in roll technology, there exists a need for an apparatus and method for stretching a film and nonwoven web material in which the material is stretched with less variability across a nip, ie. incremental stretching is minimized. There exists a need for an apparatus and method for stretching such material in both the CD and MD direction using one set of rolls. A need also exists for a method which provides discrete areas of CD and MD stretch. There also exists a need for a method for producing CD and MD stretched materials which can be accomplished with few if any repetitions in a production line. There also exists a need for a method for producing CD and MD stretched materials using a variety of materials, including fragile web materials. Further, there exists a need for nonwoven materials which exhibit enhanced levels of stretch in the CD direction, increased breathability, and reduced basis weight. Finally, there exists a need for stretched microporous film which can be stretched in both the CD and MD directions so as to allow for pore formation in multiple directions, using one set of rolls. It is to the provision of such apparatus, method, and materials that the present invention is directed.

SUMMARY OF THE INVENTION

The present invention recognizes and addresses the foregoing disadvantages, and others of prior art constructions and methods.

Accordingly, it is an object of the present invention to provide a method for stretching non-woven webs, film, and constructions made therefrom in the cross-machine direction.

It is another object of the present invention to provide a method and apparatus for biaxially stretching nonwoven webs, film, and constructions made therefrom using one set of stretch surfaces.

It is still a further object of the present invention to provide a method for targeted stretching of nonwoven webs, film, and constructions made therefrom, in discrete zones.

It is another object of the present invention to provide stretched-filled microporous film with increased breathability in a single operation.

It is still another object of the present invention to provide nonwoven webs, film, and constructions made therefrom with cross-machine directional stretch, which materials can then be incorporated as a component of a laminate or end product.

In accordance with the present invention, the foregoing and other objects and advantages are accomplished by coursing an extensible polymeric sheet material through a deformable nip, the nip being formed between two stretch surfaces having intermeshing peaks and troughs, the surfaces of the peaks and troughs being filled and covered with a deformable material forming deformable contacting surfaces, such that as the stretch surfaces are brought together in a mating fashion to form a nip, the faces of the stretch surfaces are initially smooth and the nip is initially generally linear. Compression of the stretch surfaces leads to expansion of the nip in the MD and CD directions. In one embodiment the stretch surfaces are a pair of pressed rolls including radial peaks and troughs in the machine direction, in which the troughs and peaks are filled and covered with a low durometer rubber. In another embodiment the peaks and troughs are covered and filled with a foam. In still another embodiment, the troughs are filled with foam inserts and the peaks and troughs are further covered with a foam sheet.

In a further aspect, the invention resides in a method for stretching extensible polymeric sheet material in the cross-machine direction, comprising coursing polymeric sheet material through a deformable nip, the nip being formed between two stretch surfaces having intermeshing peaks and troughs, such that the peaks and troughs of the first of the stretch surfaces are covered and filled with a deformable material whereby the peak tips and trough valleys have less deformable material covering than the remaining peak and trough surfaces, and such that the peaks and troughs of the second stretch surface are completely covered and filled with a deformable material.

In a further aspect, the invention resides in a method for stretching extensible polymeric sheet material in the cross-machine direction, comprising coursing the sheet material through a deformable nip, the nip being formed between two stretch surfaces having intermeshing peaks and troughs, the surfaces of the peaks and troughs of one of the surfaces being filled and covered with a deformable material.

In still a further aspect, the invention resides in a nonwoven web or film material and laminates made therefrom having stretch in the cross-machine direction and breathability.

BRIEF DESCRIPTION OF THE DRAWINGS

FIG. 2 is a machine direction, cross-sectional view of a roll of the present inventive apparatus.

FIG. 3 is an enlarged view of a portion of FIG. 2.

DEFINITION SECTION

Figure 1:
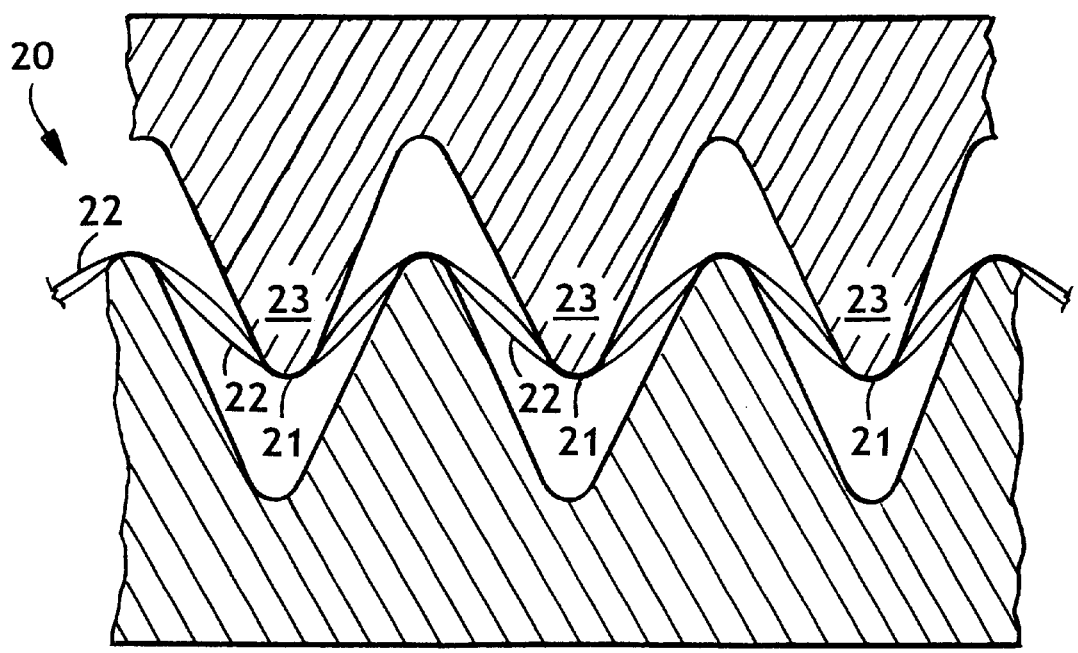
FIG. 1 is a machine direction, partial cross-sectional view of the nip of prior art rolls, illustrating the intermeshing of the rolls on a nonwoven web.

As used herein, the term "personal care product" means diapers, training pants, absorbent underpants, adult incontinence products, and feminine hygiene products.

As used herein the term "protective outer wear" means garments used for protection in the workplace, such as surgical gowns and masks, and protective coveralls.

As used herein the terms "polymer" and "polymeric" generally include but are not limited to, homopolymers, copolymers, such as for example, block, graft, random and alternating copolymers, terpolymers, etc. and blends and modifications thereof. Furthermore, unless otherwise specifically limited, the term "polymer" includes all possible spatial configurations of the molecule. These configurations include, but are not limited to isotactic, syndiotactic and random symmetries.

As used herein, the term "machine direction" or MD means the length of a fabric in the direction in which it is produced. The terms "cross machine direction," "cross directional," or CD mean the width of fabric, i.e. a direction generally perpendicular to the MD.

As used herein, the term "nonwoven web" means a polymeric web having a structure of individual fibers or threads which are interlaid, but not in an identifiable, repeating manner. Nonwoven webs have been, in the past, formed by a variety of processes such as, for example, meltblowing processes, spunbonding processes, hydroentangling, air-laid and bonded carded web processes.

As used herein the term "spunbond" refers to small diameter fibers which are formed by extruding molten thermoplastic material as filaments from a plurality of fine, usually circular capillaries of a spinneret with the diameter of the extruded filaments being rapidly reduced as by for example in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,542,615 to Dobo et al.

As used herein the term "meltblown" means fibers formed by extruding a molten thermoplastic material through a plurality of fine, usually circular die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, in various patents and publications, including NRL Report 4364, "Manufacture of Super-Fine Organic Fibers" by B. A. Wendt, E. L. Boone and D. D. Fluharty; NRL Report 5265, "An Improved Device For The Formation of Super-Fine Thermoplastic Fibers" by K. D. Lawrence, R. T. Lukas, J. A. Young; and U.S. Pat. No. 3,849,241, issued Nov. 19, 1974, to Butin, et al.

As used herein the term "sheet material" refers to non-woven webs, polymeric films, polymeric scrim-like materials, and polymeric foam sheeting. The term film shall include breathable and non-breathable monolithic film, porous, and non-porous film, and apertured and non-apertured film.

As used herein the term "laminate" refers to a composite structure of two or more sheet material layers that have been adhered through a bonding step, such as through adhesive bonding, thermal bonding, point bonding, pressure bonding or ultrasonic bonding.

As used herein the term "elastomeric" refers to sheet material which, upon application of a biasing force, is extensible or elongatable in at least one direction.

As used herein, the term "inelastic" or "nonelastic" refers to any material which does not fall within the definition of "elastic" above.

For the purpose of this application, the phrase "stretch surfaces" refers to mated/companion roll surfaces and mated/companion endless belt surfaces.

As used herein, the term "nip" refers to the contact point or points between two stretch surfaces.

As used herein, the term "breathable" refers to a material which is selectively permeable to water vapor. The water vapor transmission rate (WVTR) or moisture vapor transfer rate (MVTR) is measured in grams per square meter per 24 hours, and shall be considered equivalent indicators of breathability.

As used herein, the term "multilayer laminate" means a laminate wherein some of the layers are spunbond and some meltblown such as a spunbond/meltblown/spunbond (SMS) laminate and others as disclosed in U.S. Pat. No. 4,041,203 to Brock et al., U.S. Pat. No. 5,169,706 to Collier, et al., U.S. Pat. No. 5,145,727 to Potts et al., U.S. Pat. No. 5,178,931 to Perkins et al., and U.S. Pat. No. 5,188,885 to Timmons et al., each incorporated by reference in their entirety. Such a laminate may be made by sequentially depositing onto a moving forming belt first a spunbond fabric layer, then a meltblown fabric layer and last another spunbond layer and then bonding the laminate. Alternatively, the fabric layers may be made individually, collected in rolls, and combined in a separate bonding step. Multilayer laminates may also have various numbers of meltblown layers or multiple spunbond layers in many different configurations and may include other materials like films or coform materials, e.g. SMMS, SM, SFS.

As used herein, the term "coform" means a process in which at least one meltblown diehead is arranged near a chute through which other materials are added to the web while it is forming. Such other materials may be pulp, superabsorbent particles, cellulose or staple fibers, for example. Corform processes are shown in commonly assigned U.S. Pat. No. 4,818,464 to Lau and U.S. Pat. No. 4,100,324 to Anderson et al. each incorporated by reference in their entirety.

As used herein, the term "conjugate fibers" refers to fibers which have been formed from at least two polymers extruded from separate extruders but spun together to form one fiber. Conjugate fibers are also sometimes referred to as multicomponent or bicomponent fibers. The polymers are usually different from each other though conjugate fibers may be monocomponent fibers. The polymers are arranged in substantially constantly positioned distinct zones across the cross-section of the conjugate fibers and extend continuously along the length of the conjugate fibers. The configuration of such conjugate fiber may be, for example, a sheath/core arrangement wherein one polymer is surrounded by another or may be a side by side arrangement, a pie arrangement or an "islands-in-the-sea" arrangement. Conjugate fibers are taught in U.S. Pat. No. 5,108,820 to Kaneko et al., U.S. Pat. No. 4,795,668 to Krueger et al., and U.S. Pat. No. 5,336,552 to Strack et al. Conjugate fibers are also taught in U.S. Pat. No. 5,382,400 to Pike et al., and may be used to produce crimp in the fibers by using the differential rates of expansion and contraction of the two or more polymers. For two component fibers, the polymers may be present in varying desired ratios. The fibers may also have shapes such as those described in U.S. Pat. No. 5,277,976 to Hogle et al., U.S. Pat. No. 5,466,410 to Hills and U.S. Pat. Nos. 5,069,970 and 5,057,368 to Largman et al., which describe fibers with unconventional shapes.

As used herein the term "thermal point bonding" involves passing a fabric or web of fibers to be bonded between a heated calender roll and an anvil roll. The calender roll is usually, though not always, patterned in some way so that the entire fabric is not bonded across its entire surface, and the anvil roll is usually flat. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings, incorporated herein by reference in its entirety. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15%. Yet another common pattern is the C-Star pattern which has a bond area of about 16.9%. The C-Star pattern has a cross-directional bar or "corduroy" design interrupted by shooting stars. Other common patterns include a diamond pattern with repeating and slightly offset diamonds with about a 16% bond area and a wire weave pattern looking as the name suggests, e.g. like a window screen, with about a 19% bond area. Typically, the percent bonding area varies from around 10% to around 30% of the area of the fabric laminate web. As is well known in the art, the spot bonding holds the laminate layers together as well as imparts integrity to each individual layer by bonding filaments and/or fibers within each layer.

As used herein, the term "ultrasonic bonding" means a process performed, for example, by passing the fabric between a sonic horn and anvil roll as illustrated in U.S. Pat. No. 4,374,888 to Bornslaeger, incorporated by reference herein in its entirety.

DETAILED DESCRIPTION

Referring now in detail to the drawing figures, wherein like reference numerals represent like parts throughout the several views, one embodiment of the present inventive apparatus and method for stretching a sheet material in the CD direction includes passing the sheet material between two mated stretch surfaces which have been brought together in close association. The stretch surfaces in a first embodiment are a set of companion rolls, one of which 30 is illustrated in FIGS. 2 and 3. As illustrated in the MD, cross-sectional views of FIGS. 2 and 3, the roll 30 sits about axle 32. The roll 30 includes radial troughs 34 and peaks 36. The peaks 36 include straight side edges 37a leading to curved top portions or peak tips 37b. The roll 30 is manufactured from a hard material such as steel or rock hard rubber. In this regard, rock hard styrene butadiene rubber having a tensile strength of 6000 psi and a durometer hardness of Shore D 73–83 is available from McMaster Carr Supply Company of Atlanta, Ga. Such rolls may be machined at the Albright Machine and Grinding Co. of Atlanta, Ga. The troughs 34 and peaks 36 are perpendicular to the longitudinal axis of the roll 30 and run in the machine direction. The troughs 34 and peaks 36 are respectively filled and covered with a deformable filler material 38. The peaks 36 are covered by an amount of deformable material 40 to allow for their complete coverage. The radial troughs and peaks are covered with a deformable material such as Shore A40 durometer rubber. In an alternate embodiment, the troughs and peaks are filled and covered with Shore A 10–20 durometer neoprene rubber. Such may be accomplished at Rotodyne Corp. of Atlanta, Ga. The rubber completely fills the troughs such that the roll has a cylindrical smooth outer surface above the tops of the troughs, but giving the roll an outer surface 42 with a high coefficient of friction (hereinafter COF). While the height of the peaks and depths of the troughs on the roll may vary, the uncompressed top level of the deformable material 38 is of a uniform height at each point on the roll's outer surface. In still a further alternate embodiment, the troughs and peaks are filled and covered with a foam that exhibits a high COF. Use of a foam rather than rubber provides for primarily unidirectional compaction of the foam material upon compression, as opposed to multidirectional flow of the rubber material (downward and sideward flow) during compression. The material which covers the rolls exhibits high deformation capability and rapid recovery response following compression. The rubber material preferably fills the trough areas without leaving any voids. Combinations of two or more types of rubber, foam or other deformable covering material may be used to allow for durability with deformation properties. Furthermore, varying combinations of deformable materials may be used to allow for variable deformation ability.

Figure 4:
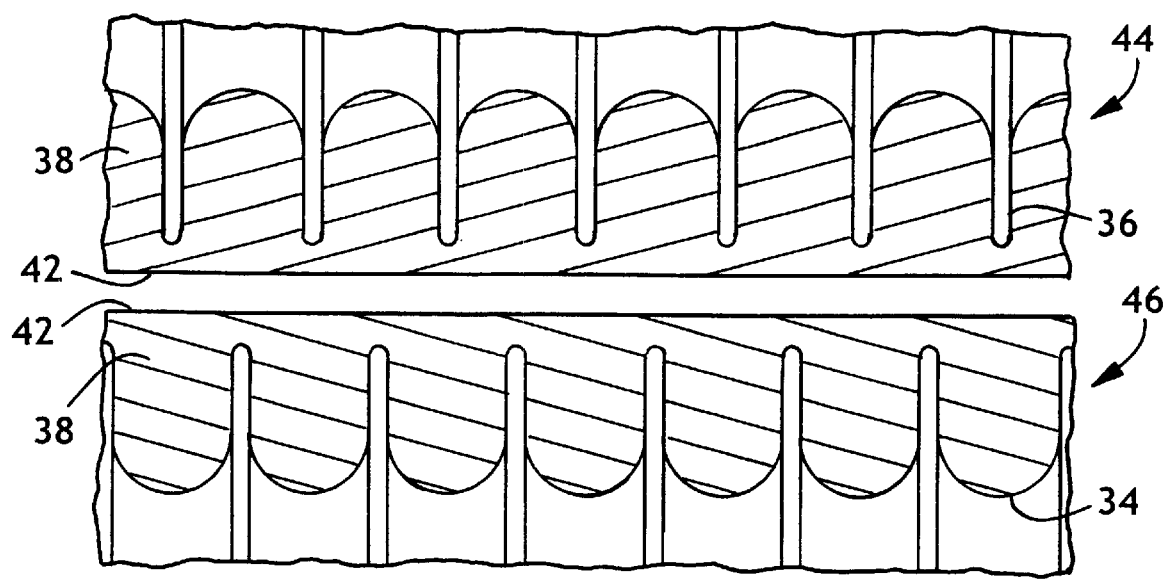
FIG. 4 is a machine direction, partial cross-sectional view of the nip of rolls of the present apparatus.

As further illustrated in FIG. 4, showing a machine direction, partial cross-sectional view of the nip of two rolls of the inventive apparatus and method, two companion rolls 44, 46 are positioned in axial alignment to each other in a mating fashion such that the peaks 36 of the first roll 44 are positioned adjacent the troughs 34 of the second roll 46. The longitudinal axis of the rolls are aligned in a parallel orientation. The rolls are held on a frame (not shown) and rotated in opposing directions by conventional rotational means, such as would be used in a bonder or lamination apparatus (not shown). The rolls are held on a frame or frames such that one roll is capable of being moved with respect to the other. The surfaces of the rolls can therefore be forced together under a constant pressure so as to allow them to intermesh. At least one of the rolls is capable of independent rotation. In this arrangement, one of the rolls is rotatably driven because of its mating engagement with the other roll. In an alternative embodiment, both rolls have independent rotation capability with independent speed control. Independent roll rotation maintains the rolls at equal speeds, thus preventing misalignment of the troughs and peaks between respective rolls when the rolls include troughs in the CD direction. Maintaining the rolls at equal speeds also avoids roll abrasion and abrasion of the sheet material between the rolls which can result in irregular MD stretch. It should be appreciated that while in the figures the rolls are shown in a vertical orientation with respect to each other, any orientation which places the rolls adjacent to one another such that the troughs of the first roll are positioned immediately adjacent the peaks of the second roll would be operable for the purposes of the present inventive apparatus and method.

As can be seen in FIGS. 5–8, in operation, two adjacent filled rolls 44 and 46 are brought together under pressure and rotated in opposing directions. The two rolls 44 and 46 are forced together to achieve the desired degree of intermesh between the respective peaks and troughs. It should be recognized that larger degrees of intermesh produces greater stretch along a sheet material. Sheet material 50 is then fed into the linear nip created by the pair of rolls 44 and 46. The sheet material is at first secured in the deformable linear nip. As the rolls turn, the nip, and the immobilized sheet material are distorted into a convoluted line, lengthening the nip and the sheet material within it. As the deformable rubber surfaces of each of the rolls is compressed, the nip point spreads in multiple directions from a contact line to a rectangular plane of some width. The nip makes an uninterrupted migration from a flat to a convoluted orientation.

Figure 6:
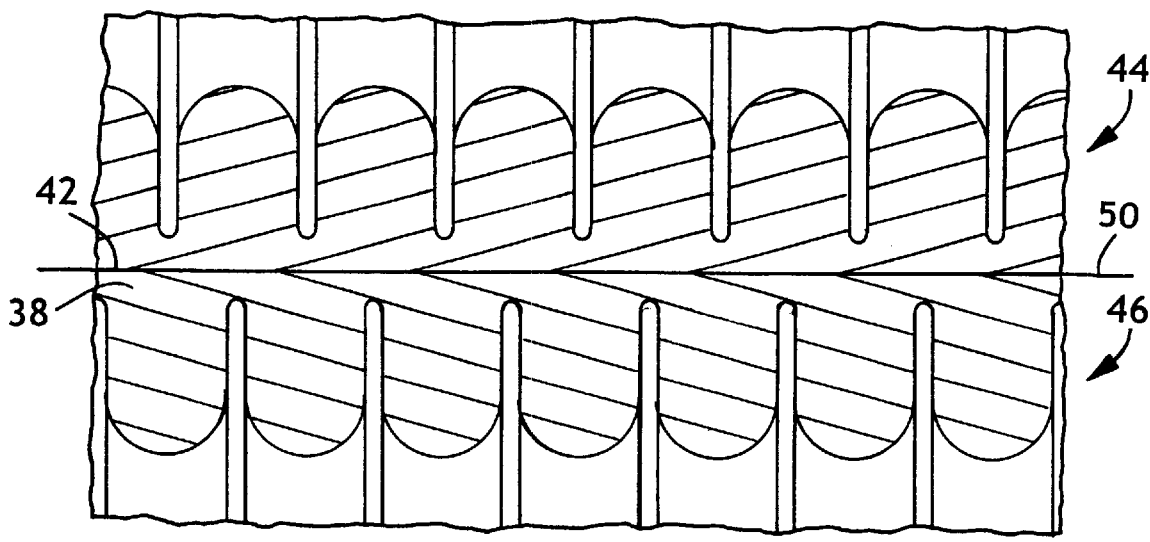
FIG. 6 is a machine direction, partial cross sectional view of the nip formed between two rolls of the present apparatus with polymeric sheet material, at position A on FIG. 5.
Figure 5:
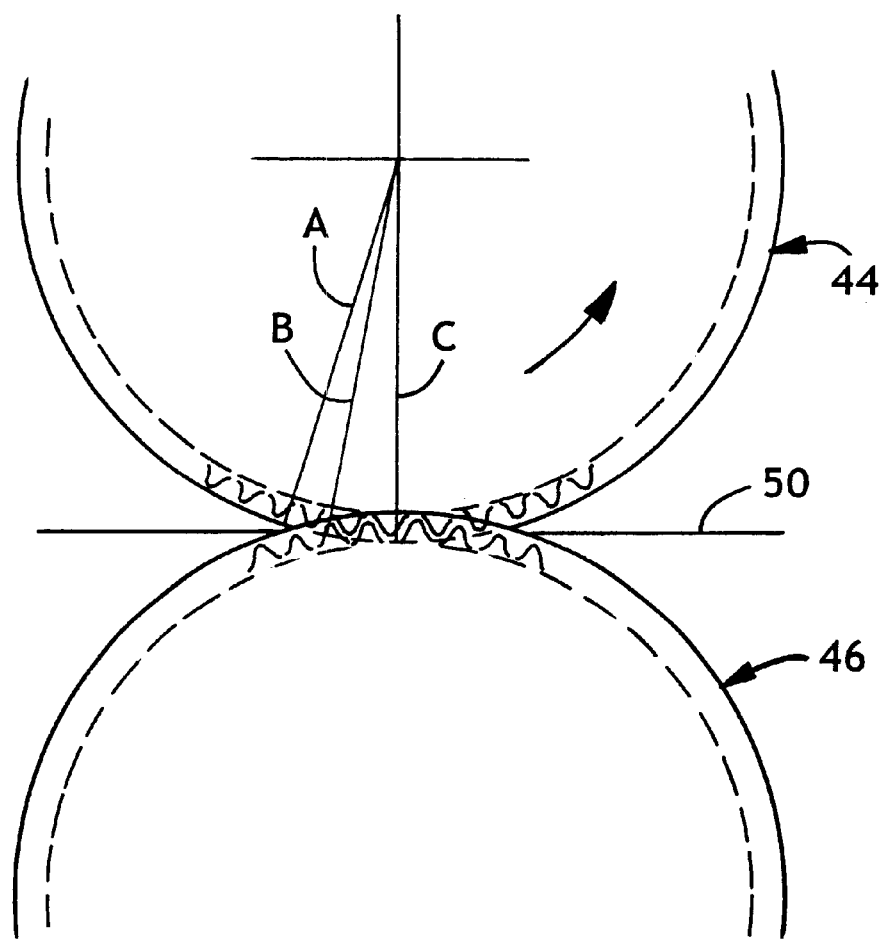
FIG. 5 is a cross-sectional view of the path of polymeric sheet material through the nip of rolls of the present apparatus, highlighting distinct points on the nip.
Figure 7:
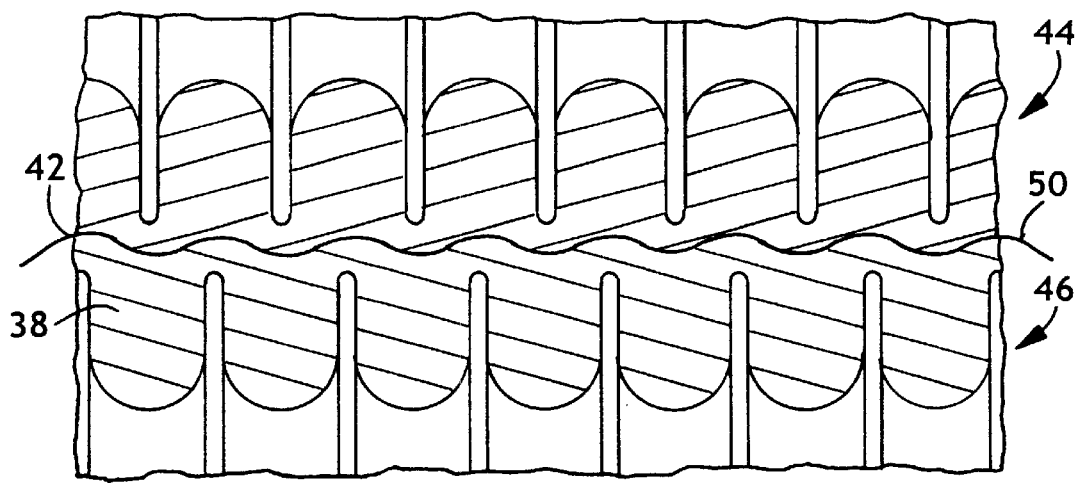
FIG. 7 is a machine direction, partial cross sectional view of the nip formed between two rolls of the present apparatus with polymeric sheet material, at position B on FIG. 5.
Figure 8:
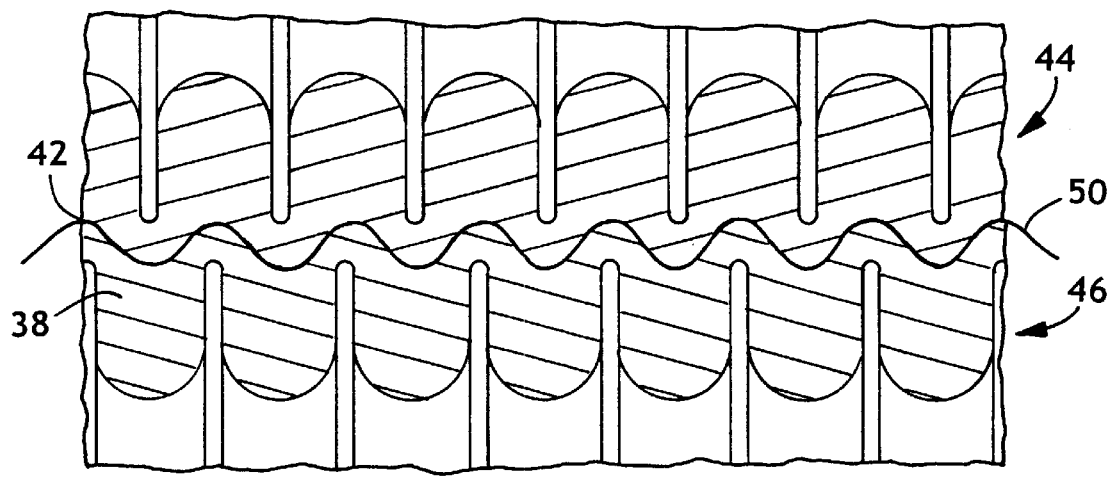
FIG. 8 is a machine direction, partial cross-sectional view of the nip formed between two rolls of the present apparatus with the polymeric sheet material, at position C on FIG. 5.

The travel path of sheet material 50 through the nip of companion rolls 44, 46 is generally illustrated in FIG. 5. The sheet material 50 is coursed between the adjacent rolls 44 and 46 such that it first contacts the two adjacent rolls at the linear nip, point A, as illustrated in FIGS. 5 and 6. At the point of first contact, the linear nip exhibits no intermeshing of the respective peaks and troughs from the two rolls. The surface of the two rolls 42 come in contact with opposite sides of the sheet material 50 and there is no noticeable deformation of the rubber surface of the rolls 38. The surfaces of the two pressed rolls 42 experience greater deformation the farther into the nip the sheet material progresses. As the sheet material 50 continues on its path through the intermeshing rolls (during roll rotation), as seen in FIGS. 5 and 7, the sheet material is deformed between the nip of the two rolls, with FIG. 7 illustrating a cross sectional view of point B on FIG. 5. As the sheet material continues further on its course through the adjacent rolls, it is most deformed at the point of highest pressure, between the two rolls. It should be appreciated that in order to achieve a less variable stretch throughout the sheet material, pressure on the rolls (the degree of intermesh) should be maintained at a constant level throughout the operation. FIG. 8 illustrates a partial cross sectional view of the point of highest pressure, point C, between the two rolls. After the sheet material has exited the stretch surfaces, i.e. the nip of the rolls, the resulting sheet material exhibits stretch in both the cross machine and machine direction. Since the material is constrained in all directions before the nip is lengthened, the nip and the material can be stretched in all directions. If the sheet material comprises microporous film, the film demonstrates both stretch, as well as increased breathability as measured by MVTR. It should be appreciated that while the peaks and troughs are illustrated in the machine direction, they may also run in the cross-machine direction.

Figure 9:
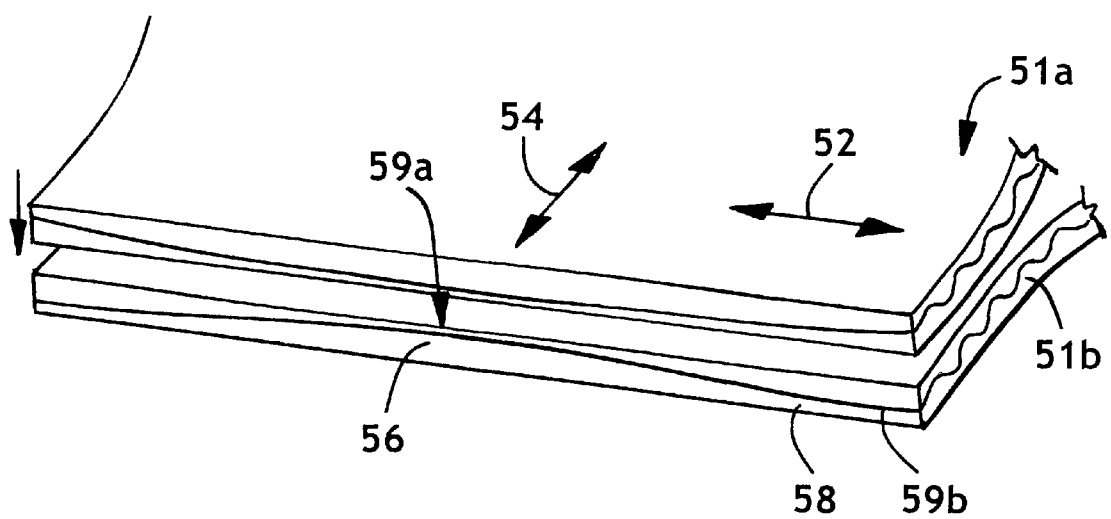
FIG. 9 is a cut-away, cross-sectional view of the surface of a pair of rolls of an alternate embodiment of the present apparatus, having machine and cross-machine directional stretch zones.

In a further aspect of the inventive apparatus and method, sheet material 50 is coursed between stretched surfaces having filled and covered troughs and peaks of varying depths and heights over the stretch surface. The top level of the deformable covering 38 on the roll surface is held constant however. As an example, in reference to FIG. 9 illustrating a cut-away, cross sectional view of the surface of a pair of rolls having machine and cross-machine directional stretch zones, the stretch surface of companion rolls 51*a* and 51*b* have covered peaks and troughs running in the machine direction 52 along the rolls' surfaces. The height and depth of the peaks and troughs vary in the cross-machine direction 54. Peaks 56 and troughs 58 in the cross-machine direction are also covered with deformable material. The tapering height of the cross-directional peaks create areas of minimum stretch at the high point 59*a,* and areas of maximum stretch at the low point 59*b.*

Figure 10:
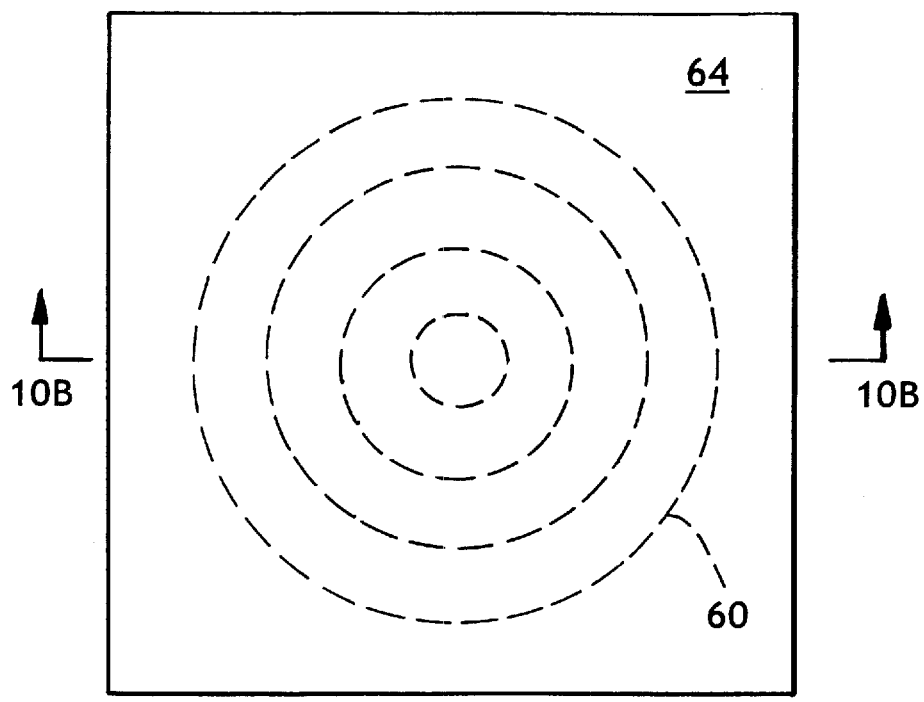
FIG. 10 is a partial top view of an alternate embodiment of a roll surface of the present apparatus, illustrating discrete zones of stretch shown planar for ease of reference.
Figure 10A:
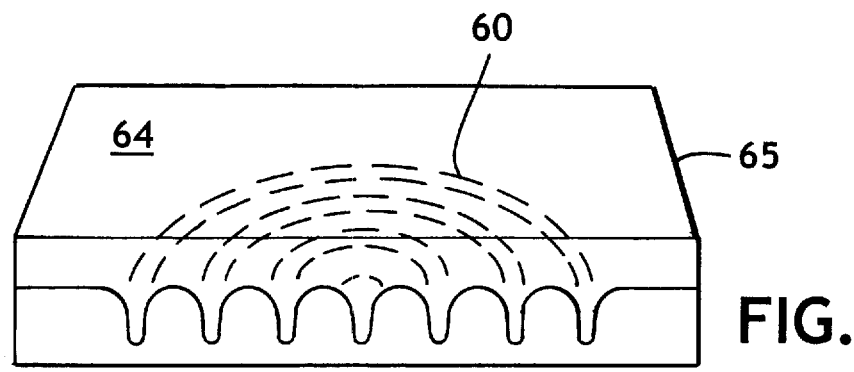
FIG. 10A is a partial cross-sectional view of the roll surface of FIG. 10 taken along line 10B–10B shown planar for ease of reference.
Figure 10B:
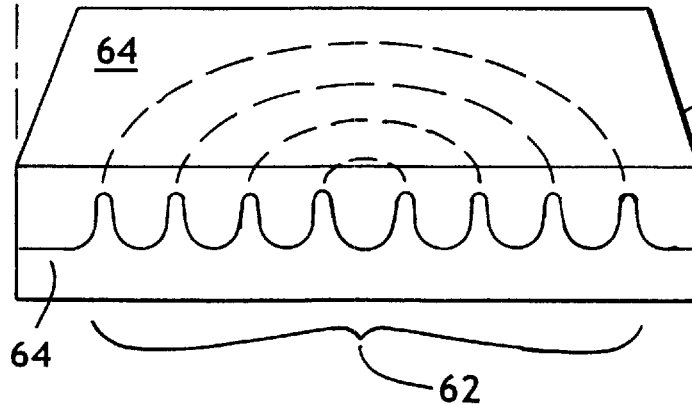
FIG. 10B is a partial cross-sectional view of the companion roll surface to the roll surface of FIG. 10A shown planar for ease of reference.
Figure 10C:
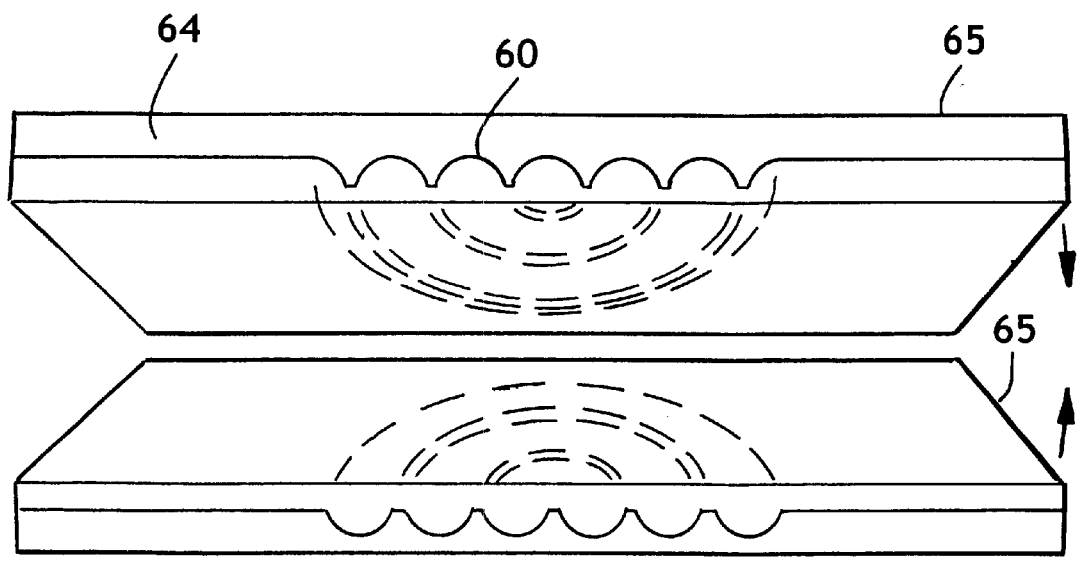
FIG. 10C is a partial cross-sectional view of a portion of roll surfaces of the present apparatus, prior to surface intermeshing shown planar for ease of reference.
Figure 10D:
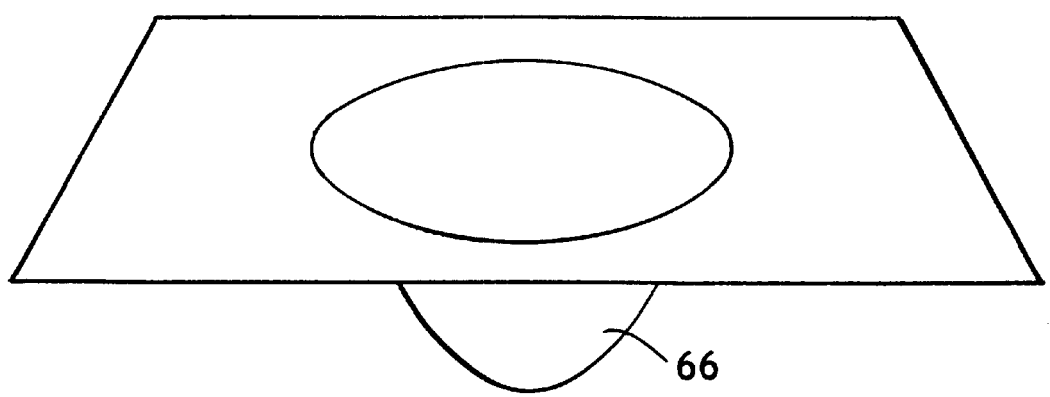
FIG. 10D is a perspective view of sheet material which has been coursed through the intermeshed roll surfaces of FIG. 10C.
Figure 11:
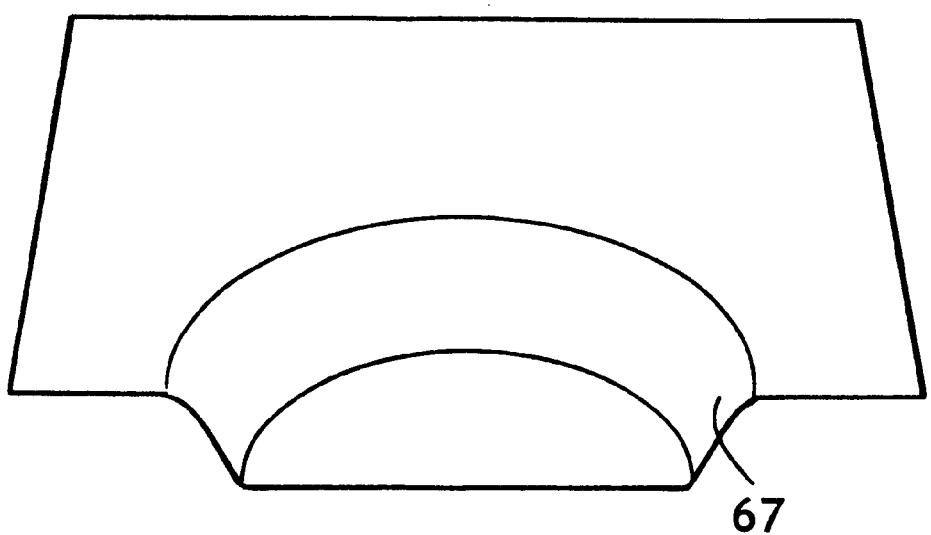
FIG. 11 is a partial perspective view of sheet material which has been coursed through an alternate embodiment of the roll surfaces of FIG. 10C.

In a further aspect of the inventive apparatus and method, the stretch surfaces can contain discrete areas of covered peaks and troughs surrounded by areas of minimal stretch (having no troughs), where nip deformation is reduced. As an example, in reference to FIG. 10, illustrating a partial top view of an alternate embodiment of a roll surface of the present apparatus, the roll surface includes discrete zones of stretch. The filled peaks and troughs are in the form of concentric circular shapes 60 formed in the surface of the rolls. The surrounding surface area 64 is devoid of peaks and troughs. In use, a roll 65 having filled and covered concentric peaks and troughs, as seen in FIGS. 10A and 10B is positioned immediately adjacent the mated troughs and peaks of a companion roll 65*a*. This configuration of the roll surfaces produces targeted omni-directional stretched zones within unstretched or reduced stretch zones, when the stretch surfaces are pressed together, as seen in FIG. 10C. This configuration produces a conical shaped profile 66 within sheet material, as seen in FIG. 10D. Removal of the innermost rings of the concentric circular zone 60 provides for a truncated cone-shaped profile 67 resulting in the formation of a pouch in the sheet material, as illustrated in FIG. 11. As a result of using rolls with discrete zones of stretch, sheet materials can be produced having discrete stretched zones. Such materials are useful for incorporation into protective outer wear and personal care absorbent products, where body conformance is of the utmost concern. Such arrangements may be used to form for example pouches in nonwoven fabric to conform to body contours such as buttocks, breasts, elbows, and knees.

In a similar manner, the zones of stretch on the roll surfaces are used to create discrete zones of breathability when filled microporous film is coursed between the pair of rolls. Such arrangements may be used to provide targeted regions of breathability depending on the product's use on the body.

Figure 12:
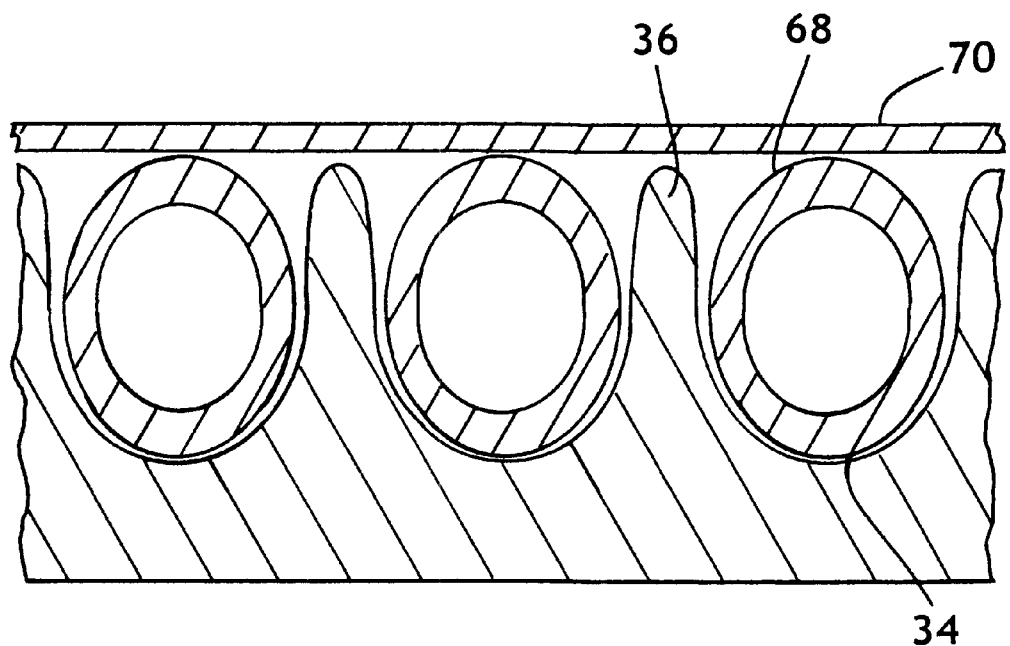
FIG. 12 is a partial cross-sectional view in the machine direction of an alternate embodiment of a roll surface of the present apparatus.
Figure 12A:
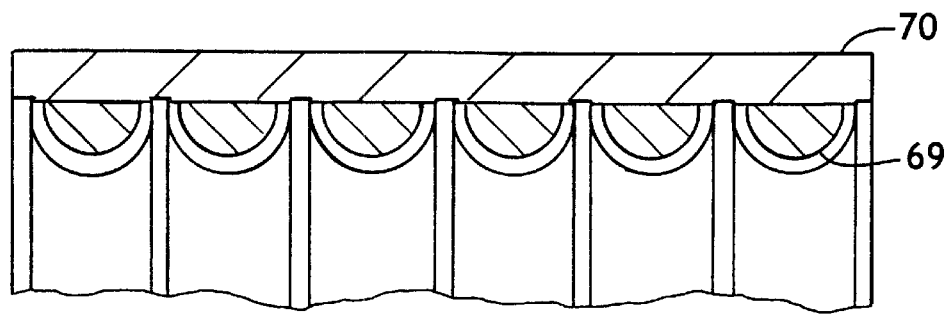
FIG. 12A is a partial cross-sectional view in the machine direction of an alternate embodiment of a roll surface of the present apparatus.

In still a further aspect of the inventive apparatus and method, deformable inserts can be placed in the troughs in lieu of a solid or foam deformable coating. A deformable sheet covering can then be placed above the peak tips. In reference to FIG. 12 illustrating a machine direction, partial cross-sectional view of a roll surface, hollow cylindrical foam inserts 68 are placed in the troughs 34 of a roll. Additionally, a foam layer 70 is placed over the peaks 36 and foam inserts 68. Use of the foam inserts 68 with a foam covering layer 70 allows for deformation of the roll surface at less pressures than are required when compressing two rolls with a solid rubber covering. As in the case of a solid rubber covering, the foam used in this aspect of the inventive apparatus and method exhibits a high COF, high levels of deformability, and subsequent rapid recovery following compression. In still a further aspect of the inventive apparatus and method, the foam inserts 69 may conform to the shapes of the troughs, as illustrated in FIG. 12A.

Figure 12B:
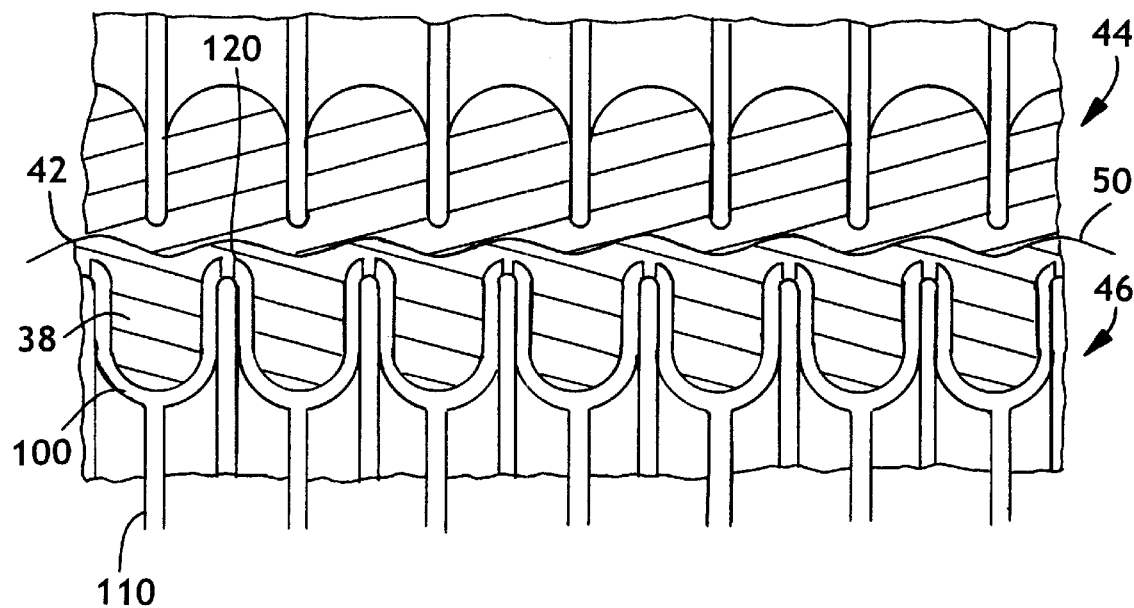
FIG. 12B is a partial cross-sectional view in the machine direction of an alternate embodiment of a roll surface of the present apparatus.

In still a further aspect of the inventive apparatus and method as seen in FIG. 12B, channels 100 may be positioned under one or both of the roll's deformable filler surfaces 38, adjacent to the peaks and troughs or within the troughs. The channels can be formed of a synthetic polymer membrane such as a polyolefin, elastomer or a flexible metal such as aluminum, or of selectively positioned voids beneath or within the deformable filler material. A fluid such as a liquid or gas can then be pumped into the channels 100 through feeder tubes 110 contained within the roll interior. Examples of fluids which can be delivered through the channels include water, compressible air or noncompressible oil. The deformable filler material 38 is held in place over the peaks and troughs by the use of selectively positioned connective points or struts 120 (of the deformable material) which hold the deformable surface to the roll. The struts 120 may be solid to allow for zoned pressure application on regions of the roll. In the alternative, the struts can themselves include passageways or holes to allow fluid to move between channels. This would allow for uniform pressure on the deformable surface with the need for one or only a few feeder tubes. The fluid can be pumped into the channels by pumping means as are generally known in the art.

In operation, fluid may be pumped into the desired channels to provide pressure on the deformable surface, thereby effectively altering the hardness of the deformable surface. The channels may apply pressure to the deformable filler over the entire roll surface or only in the working nip portions of the roll surfaces.

Figure 13:
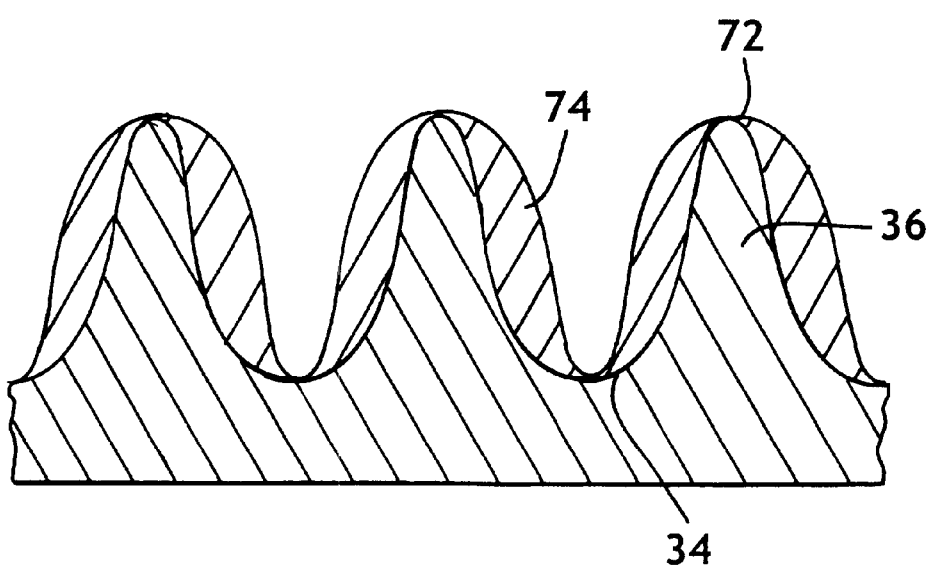
FIG. 13 is a partial cross-sectional view in the machine direction of an alternate embodiment of a roll surface of the present apparatus.

In still a further aspect of the inventive apparatus, as illustrated in FIG. 13, the deformable material on the covered troughs and peaks of one of two stretch surfaces can contain distinct thin 72 and thick 74 regions, with the thicker regions being placed between the peak and troughs, along the shaft of the peaks 36, and with the thinner regions being placed at the tip of the peaks 72 and at the base of the troughs 34. The companion stretch surface i.e. the second roll or belt, is a completely filled and covered mated stretch surface, as previously described.

Figure 14:
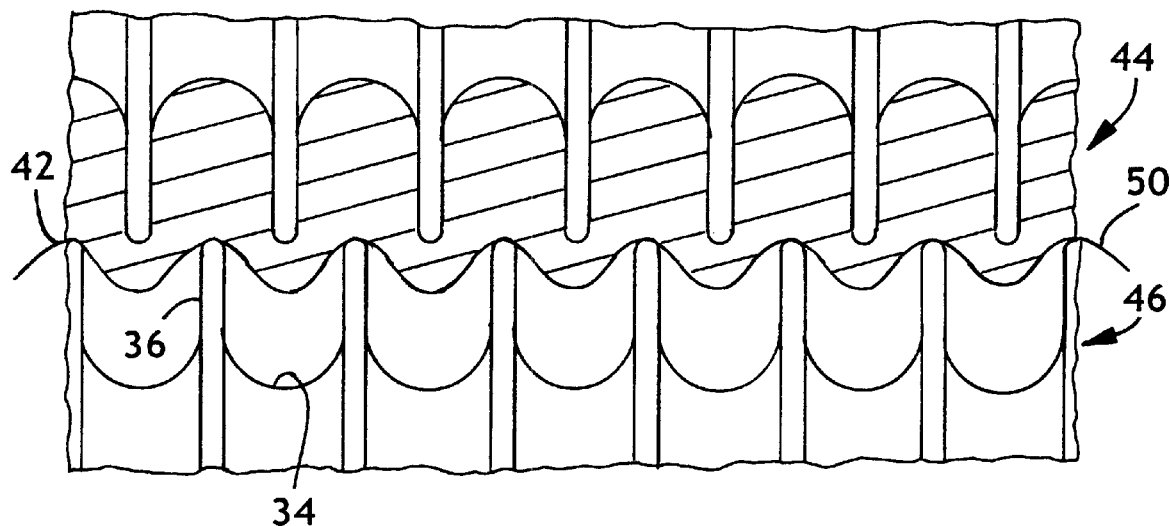
FIG. 14 is a partial cross-sectional view in the machine direction of an alternate embodiment of companion roll surfaces of the present apparatus.

In still a further aspect of the inventive apparatus and method as illustrated in FIG. 14, one of two companion stretch surfaces 44, is completely filled and covered with deformable material, such that in an uncompressed state the surface of the filled and covered roll appears smooth, as has already been described. A second companion stretch surface 46 is devoid of any deformable filler material. In this fashion, sheet material 50 that is coursed between the pressed companion stretch surfaces (i.e., rolls) is held between the deformable outer surface of the first roll 42 and the peaks of the second roll 36.

Figure 15:
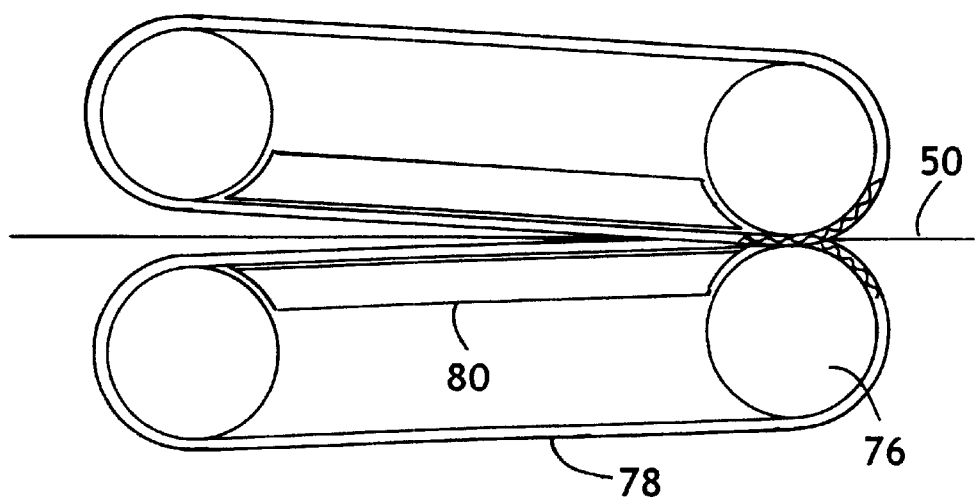
FIG. 15 is a cross-sectional view of an alternate embodiment of the present apparatus.

Finally, in still a further aspect of the inventive apparatus and method, as illustrated in FIG. 15, sheet material 50 is coursed between continuous belts, as opposed to rolls. Rollers 76 guide the belts 78 to a nip. Pressure is maintained on the belts through either pressure plates 80 or a series of rollers (not shown) in order to maintain the close association of the belt surfaces as the belts enter the nip. As with embodiments utilizing filled and covered rolls, peaks and troughs present on the belt (not completely shown) are respectively covered and filled with a deformable material to allow for an expandable nip between two deformable stretch surfaces.

The raised, intermeshing features in each of the stretch surface embodiments may be arranged on the stretch surfaces in radial, axial or combinations of each direction providing, MD, CD or combination stretching. These variations may also be placed sequentially on the stretch surfaces to provide repeating, zoned areas of the same stretching options.

Figure 16:
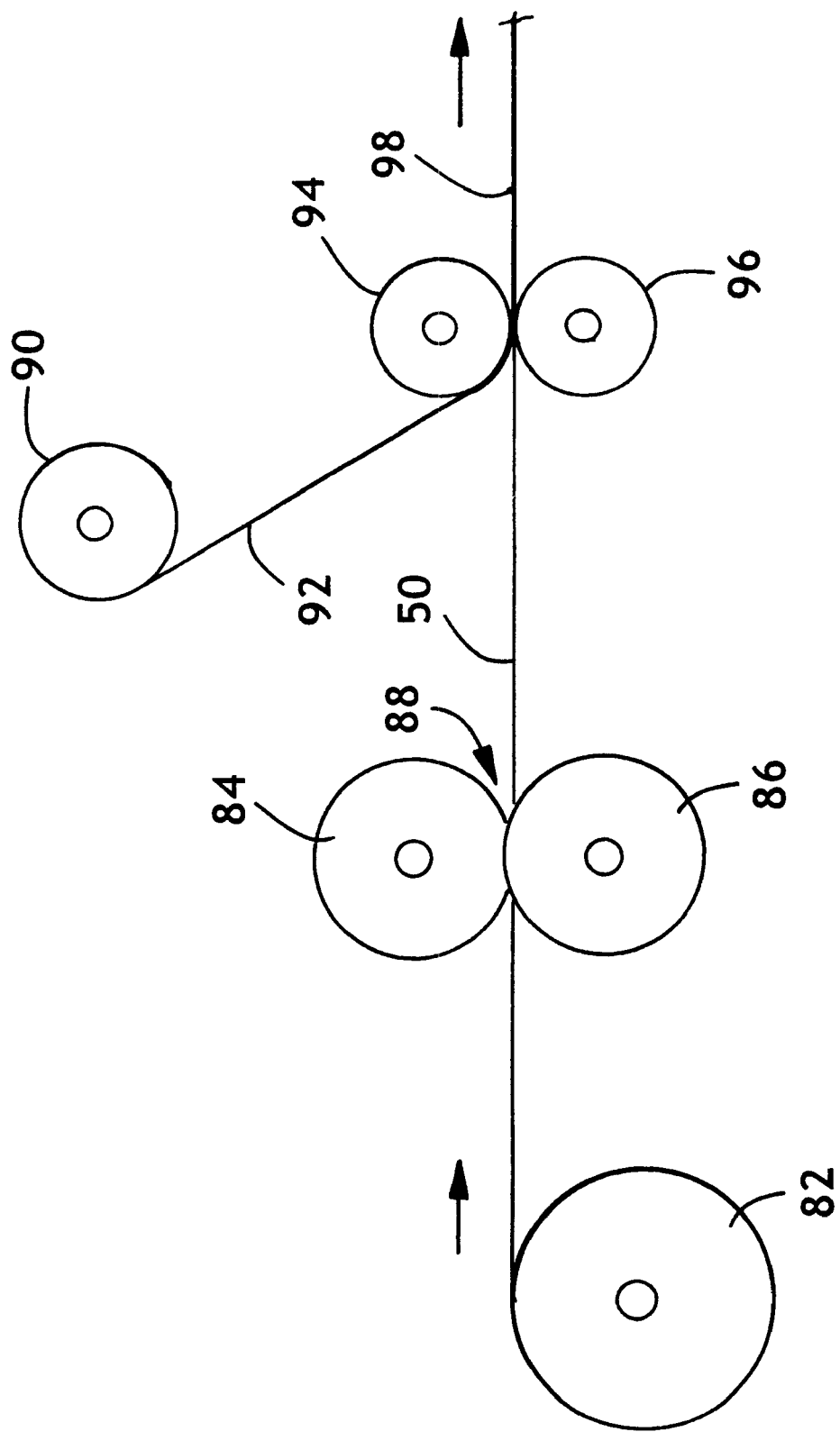
FIG. 16 is a schematic view of the process for making a laminate using the present inventive method.

The stretched sheet materials produced according to the present inventive methods can be laminated to one or more additional sheet materials. For example, oftentimes it may be desirable to laminate stretched filled film to one or more substrates or support layers as illustrated in FIG. 16. Lamination of the film to a support layer may enhance the strength and thus the durability of the film.

The support layer shown in FIG. 16 is a fibrous nonwoven polymeric web. Such webs may be formed from a number of processes including, but not limited to, spunbonding, meltblowing and bonded carded web processes. The support layer in a laminate containing the film layer can for example be necked polypropylene spunbond, crimped polypropylene spunbond, bonded carded webs, elastomeric spunbond or meltblown fabrics produced from elastomeric resins.

The fibrous nonwoven web support layer can add additional properties to filled film such as a more soft, cloth-like feel. This is particularly advantageous when filled film is being used as a barrier layer to liquids in such applications as outer covers for personal care absorbent articles and as barrier materials for hospital, surgical, and clean room applications such as, for example, surgical drapes, gowns and other forms of apparel.

A plurality of support layers also may be used. Examples of such materials can include, for example, spunbond/meltblown laminates and spunbond/meltblown/spunbond laminates such as are taught in Brock et al., U.S. Pat. No. 4,041,203 which is incorporated herein by reference in its entirety.

Referring again to FIG. 16, a fibrous nonwoven web forms the support layer 92. One or both of the laminating rolls 94, 96 may be heated to aid in bonding. Typically, one of the laminating rolls is also patterned so as to impart a discrete bond pattern with a prescribed bond surface area to the web. The other roll is usually a smooth anvil roll but this roll also may be patterned if so desired (There are a number of discrete bond patterns which may be used. See, for example, Brock et al., U.S. Pat. No. 4,041,203). Once the filled film has been sufficiently stretched and the support layer has been formed, the two layers are brought together and laminated to one another using the pair of laminating rolls or other means.

In particular, the sheet material 50 is first unwound from supply roll 82. The sheet material (in this case, filled film) 50 is then stretched in at least the cross-machine direction between intermeshing rolls 84 and 86, in nip 88. The stretched filled film then travels in the direction indicated by the arrows and passes through the pressed nip of a laminating roll arrangement. The nonwoven web 92 is unwound from a supply roll 90. The nonwoven web 92 is fed to the lamination roll arrangement which is comprised of a patterned calendar roll 94 and a smooth anvil roll 96. One or both of the patterned calendar roll and smooth anvil roll may be heated and the pressure between these two rolls may be adjusted by well known means to provide the desired temperature and bonding pressure to bond the web to the film to form a composite laminate material 98. The laminate can be laminated by means known to those skilled in the art such as, for example, by thermal bonding, ultrasonic bonding, adhesive bonding and the like, although thermal point bonding is an exemplary means of laminating the respective layers.

Once the laminate exits the laminating rolls, it may be wound up into a roll for subsequent processing.

Alternatively, the laminate may continue in-line for further processing or conversion. It should be appreciated that additional layers can also be laminated to the composite. The additional layer or layers can comprise, as examples, extensible nonwoven materials, meshed fabrics, elastic composite materials and/or other like materials. The film sheeting may also comprise either a mono-layer or multi-layer film such as is described in WO 96/19346 to McCormack et al. assigned to common assignee and which is incorporated by reference in its entirety.

It should also be appreciated that the materials in the method can be interchanged such that a nonwoven web itself may be coursed through the intermeshing rolls 84, 86 and then laminated to a second sheet material, such as a non-filled breathable film. Alternatively, a laminate itself, such as a laminate of a filled microporous film and a nonwoven web sheet can be coursed through the set of intermeshing rolls to impart either CD, MD, or both CD and MD extensibility/stretch in accordance with the present inventive method. Furthermore one or more nonwoven webs may be coursed through the intermeshing rolls of the inventive method and then laminated to one or more layers of monolithic films in order to create a multilayer laminate.

Polymers useful in the fabrication of sheet materials to be stretched in accordance with the inventive process include, but are not limited to, polyolefins including homopolymers, copolymers, terpolymers and blends thereof. Bicomponent polymeric sheet materials may also be stretched in accordance with the inventive process. Additional film forming polymers which may be suitable for use, alone or in combination with other polymers, include ethylene vinyl acetate (EVA), ethylene ethyl acrylate (EEA), ethylene acrylic acid (EAA), ethylene methyl acrylate (EMA), ethylene normal butyl acrylate (EnBA), Thermoplastic polyurethane (TPU), poly (ether-ester) and poly (amid-ether) block copolymers. Suitable thermoplastic polyurethanes are available from the Dow Chemical Company under the designation Pellethane®, or from the B F Goodrich Company under the designation Estane®. Suitable polyetheramides are available from the Elf Atochem Company under the designations Pebax. Depending on ultimate product use, elastomeric polyolefins are preferred such as, for example, ethylene and propylene as well as copolymers, terpolymers and blends thereof.

If film sheeting to be processed in accordance with the inventive method comprises breathable films, breathable microporous film can be formed by any one of various methods known in the art. As an example, film can comprise a filled film which includes a thermoplastic polymer and filler. These (and other) components can be mixed together, heated and then extruded into a monolayer or multilayer film. Such multilayered films are described in WO 96/19346 to McCormack et al., assigned to the same assignee and incorporated herein by reference in its entirety. The filled film may be made by any one of a variety of film forming processes known in the art such as, for example, by using either cast or blown film equipment. The thermoplastic polymer and filler can then be stretched using the inventive method. The inventive apparatus and method can be used for films that require cracking or stretching to enhance breathability and/or to allow for whitening.

Examples of fillers for stretched filled film include calcium carbonate ($CaCO_3$), various kind of clay, silica ($SiO_2$), alumina, barium sulfate, sodium carbonate, talc, magnesium sulfate, titanium dioxide, zeolites, aluminum sulfate, cellulose-type powders, diatomaceous earth, magnesium carbonate, barium carbonate, kaolin, mica, carbon, calcium oxide, wood powder, cellulose-type powders, magnesium oxide, aluminum hydroxide, pulp powder, cellulose derivative, polymer particles, chitin and chitin derivatives.

The filler particles may optionally be coated with a fatty acid, such as strearic acid, which may facilitate the free flow of the particles (in bulk) and ease of dispersion into the polymer matrix.

Non-filled breathable films which may be laminated to stretched sheet materials using the present inventive method include thermoplastic polyurethane (TPU), ethylene vinyl acetate (EVA) and polyester elastomers. These films can be attached to CD, MD, or CD and MD extensible facings to produce a breathable elastic laminate, and can be attached in single faced or double faced laminates.

The composition of nonwoven web sheet material to be processed in accordance with the inventive method may be selected as desired to achieve a material having the desired properties, such as elasticity, hand, tensile, strength, cost etc.

The inventive apparatus and method may also be used to stretch metallocene-catalyzed ethylene-based or propylene-based polymeric sheet materials. The term "metallocene-catalyzed" as used herein includes those polymeric materials that are produced by the polymerization of at least ethylene or propylene using metallocenes or constrained geometry catalysts, a class of organometallic complexes, as catalysts. These catalysts are also sometimes referred to as the single-site catalysts.

For example, a common metallocene is ferrocene, a complex with a metal sandwiched between two cyclopentadienyl (Cp) ligands. Metallocene process catalysts include bis(n-butylcyclopentadienyl)titanium dichloride, bis(n-butylcyclopentadienyl)zirconium dichloride, bis (cyclopentadienyl)scandium chloride, bis(indenyl) zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl (cyclopentadienyl, -1-flourenyl)zirconium dichloride, molybdocene dichloride, nickelocene, niobocene dichloride, ruthocene, titanocene dichloride, zirconocene chloride hydride, and zirconocene dichloride, among others. A more exhaustive list of such compounds is included in U.S. Pat. No. 5,374,696 to Rosen et al. and assigned to the Dow Chemical Company. Such compounds are also discussed in U.S. Pat. No. 5,064,802 to Stevens et al. and also assigned to Dow.

Sheet materials and laminates produced in accordance with the present inventive method can be utilized in a wide variety of applications such as, for example, in personal care absorbent products and protective outer wear. However, it will be appreciated by those skilled in the art that the sheet materials and laminates made therefrom of the present invention can be advantageously utilized in numerous other applications employing fabrics requiring, extensibility/stretch, conformance and/or breathability.

The following examples are meant to be exemplary procedures only which aid in the understanding of the present invention. The invention is not meant to be limited thereto.

EXAMPLE 1

Conditions

Intermeshing rolls of steel construction and having the dimensions of 41.91 centimeters (16.5 inches) in length with a diameter of 10.80 centimeters (4.25 inches) were constructed. The rolls had 2.54 centimeter (1.0 inch) diameter steel shafts extending from their ends. Concave troughs were radially formed into the cylindrical surface of the rolls. The troughs were at approximately 0.44 centimeters (0.175 inches) intervals and had a depth of approximately 0.159 centimeters (0.0625 inches). The radius of the troughs were approximately 0.094 centimeters (0.037 inches), and the radius of the peaks between troughs were approximately 0.03 centimeters (0.012 inches).

The roll surfaces were filled and covered with a rubber of Shore A 40 durometer hardness, to a uniform uncompressed level above the peaks. The rolls were positioned in axial alignment (that is parallel alignment of the longitudinal axis of the rolls) that positioned the peaks of one roll in alignment with the troughs of the other. The rubber completely filled the troughs and was ground to a cylindrical surface extending 0.159 centimeters (0.0625 inches) above the tops of the peaks. The rolls were mounted on bearings and secured within a frame that positioned the first roll beneath the second roll, with the longitudinal axis of the rolls held parallel. The first roll was secured to the frame, and the second roll was moveable with respect to the first roll. The second roll was moveable by means of two jacking screws, each acting upon the bearing housing of the second roll, and having a pitch of 11 threads per inch, thus yielding a displacement of 0.23 centimeters (0.090 inches) per revolution.

In each of the examples utilizing the 16.5 " length rolls, the rolls were brought into surface contact, the slack taken out of the jacking screws, and the screws turned 1.5 revolutions further, yielding a screw displacement of 0.345 centimeters (0.136 inches). Due to the very high compression forces on the rubber and resultant flexing of the framework, the measured roll to roll displacement (intermesh) was approximately 0.254 centimeters (0.10 inches).

EXAMPLE 1A

The sheet material initially coursed through the set of rolls was a polymeric film obtained from the Edison Plastics® Company of Newport News, Va., having a designation of XP3311b matte/e14. The film was a polyester with clay filling, and having a thickness of 0.0028 centimeters (0.0011 inches). The film was cut to 2.54 centimeters (1.0 inches) in the MD and 15.24 centimeters (6.0 inches) in the CD. The film was positioned with the 15.24 centimeter (6 inch) dimension parallel to the roll longitudinal axes and passed through the nip by hand cranking the rolls. The final measured length of the film sample was approximately 16.51 centimeters (6.5 inches), an increase of approximately 1.083×.

EXAMPLE 1B

The sheet material was a polymeric film obtained from the Edison Plastics® Company of Newport News, Va., having a designation of FXP 2575. The film was of a linear low density polyethylene with 50% calcium carbonate fill. The film was stretched in the MD to 3.7× its original length in a previous operation. The film sample was prepared and processed as in Example 1A. The final measured length of the film sample was approximately 16.19 centimeters (6.375 inches) for an increase of 1.062×.

EXAMPLE 1C

The sheet material was a polymeric film as described in Example 1A, co-apertured and bonded to a 6.0 denier, bonded carded web obtained from the Kimberly-Clark Corporation. The nonwoven web was comprised of 100% binder fiber, the web having a basis weight of 23.74 gsm (0.7 osy) and a density of 0.03 g/cc. In order to convert an "osy" designation to a "gsm" designation it is necessary to multiply the osy number by 33.91. The binder fibers were comprised of a polypropylene core and a low density polyethylene sheath having a 50/50 core /sheath ratio. A first sample was prepared and processed as in Example No. 1A. The final measured length of the film sample was approximately 15.88 centimeters (6.25 inches) for an increase of approximately 1.04×. A second sample was cut to the same dimensions. The major dimension for the second sample was in the MD. The film sample was prepared and processed as in Example 1A. The final measured length of the film sample was approximately 16.51 centimeters (6.5 inches) for an increase of 1.083×.

EXAMPLE 2

Conditions

A second set of rubber covered and filled steel rolls was prepared. The rolls were coated with a 20 durometer neoprene rubber. The rolls were mounted in axial alignment (parallel arrangement) on a conventional thermal bonder arrangement such that the first roll (the top roll) was stationary, while the second roll (the lower roll) was capable of being moved with respect to the first roll. The bonder arrangement included two rolls mounted on a frame. The rolls were driven by belt driven timing belts which were in turn driven by a conventional electrical motor. Both rolls were driven independently. A hydraulic jack was used to increase engagement between the two rolls. The top roll was measured at 64.29 centimeters (25 5/16 inches) from end to end, and the bottom roll was measured at 64.6 centimeters (25 7/16 inches). The peaks and troughs were aligned between the two rolls. The rolls were run at approximately 38.1 centimeters per second (cm/sec) (75 feet per minute (fpm)) for the majority of the trials. For one run, the rolls were run at 10.16 cm/sec (20 fpm). This run included the addition of heat.

Experiments 2A

A series of nonwoven web sheets were coursed through the second set of rolls. The nonwoven web sheets included flexible polyolefin sheeting, and in particular, Huntsman deformable polyolefin/polypropylene bicomponent spunbond fiber (FPO/PP) sold under the brand identifier REX-FLEX FLEXIBLE POLYOLEFINS.

The term flexible polyolefin (FPO) refers to polyolefin materials containing propylene based polymer with controlled regions of atactic polypropylene units to achieve a desired crystallinity such as described in U.S. Pat. No. 5,910,136 entitled "Oriented Polymeric Microporous Films with Flexible Polyolefins and Methods of Making the Same" to Hetzler and Jacobs; the entire contents of which are incorporated herein by reference.

Stretchable bicomponent spunbond (FPO/PP) has both MD and CD stretch properties. This material has demonstrated stretch extensions between 50 and 75%, soft hand, fiber crimping at ambient FDU (fiber draw unit) temperature, and the strength of traditional spunbond. Sheet materials have been produced containing polypropylene side by side (S/S) with flexible polyolefins. W201 and W104 FPO polymers for use in the S/S bicomponent PP spunbond were obtained from the Rexene Corp. of Texas. Similarly, sheet materials can be produced with a sheath/core fiber arrangement (S/C). The FPO W201 is a copolymer with a melt flow rate of 18 dg/min at 230° C. and the FPO W104 is a homopolymer with a melt flow rate of 30 dg/min at 230° C. FPO polymer melt flow rates of 50 dg/min and higher are possible which may improve processing while maintaining adequate stretch properties. Fiber sizes of 14 microns and higher have been used in the material. Polymer ratios can range from 50/50 to 70/30 PP/FPO. While single bank fabrics have been produced, improved properties are expected with layered or two bank materials. The fiber draw unit air supply can range from room temperature to 260° F. Highly crimped fibers can be produced through the fiber draw unit at room temperature as described in provisional application filed Nov. 12, 1998 to James Richard Neely, et al, entitled Method of Crimping MultiComponent Fibers, of Ser. No. 60/108,125 and assigned to the same assignee, the entire contents of which are incorporated herein by reference. Materials have been produced utilizing the Hansen and Pennings bond pattern and Wire Weave bond pattern, with similar properties. The FPO/PP spunbond can be utilized as a stretchable member of a disposable personal care product, such as a diaper liner, diaper outer cover, hook and loop fastener base, a substitute for necked spunbond material, a component of film laminates, and a component of other laminates where stretch and recovery are desired. Stretchable bicomponent spunbond (FPO/PP) can be made in-line in one step. Fabric produced from such process exhibits recovery from stretch due to inherent elasticity. Further description of flexible polyolefins can be found in U.S. Pat. No. 5,723,546 to Sustic and assigned to the Rexene Corporation.

Polypropylene spunbond (PP SB) sheeting and rib knit material of a polyethylene/polypropylene bicomponent fiber were also coursed through the rolls. The pressure/engagement correlation was measured. Table 1 describes observed distances at given pressures between the two rolls. Total engagement was a 0.32 centimeter (1/8 inch). A hydraulic jack was later used to increase engagement. The hydraulic jack increased engagement by 0.16 centimeter (1/16 inch) for a total engagement of 0.48 centimeter (3/16 inch).

TABLE 1

| Pressure g/cm² (psi) | Distance cm (in) |
|---|---|
| 562.46 (8) | 36.99 (14 9/16) |
| 2812.28 (40) | 36.91 (14 17/32) |
| 4921.49 (70) | 36.75 (14 15/32) |
| 6327.63 (90) | 36.67 (14 7/16) |
| 7030.7 (100) | 36.67 (14 7/16) |

Rotation of the rolls did not result in any further engagement. The following Table 2 describes the stretch that was observed for each sample during the trial.

TABLE 2

| Trial | Material | Conditions cm/sec (fpm) | Direction | Initial cm (in) | Final cm (in) | Difference cm (in) | Stretch (%) |
|---|---|---|---|---|---|---|---|
| 1 | FPO/PP | no heat; 38.1 (75) | CD | 7.62 (3) | 8.57 (3 3/8) | 0.95 (3/8) | 12.5 |
| 1 | FPO/PP | no heat; 38.1 (75) | MD | 7.62 (3) | 8.57 (3 3/8) | 0.95 (3/8) | 12.5 |
| 2 | FPO/PP | heat; 38.1 (75) | CD | 7.62 (3) | 8.26 (3 1/4) | 0.64 (1/4) | 8.3 |
| 2 | FPO/PP | heat; 38.1 (75) | MD | 7.62 (3) | 9.53 (3 3/4) | 1.91 (3/4) | 25 |
| 3 | Rib Knit | Significant Abrading; No measurements taken at this time | | | | | |
| 4 | PP SB | no heat; 38.1 (75) | CD | 7.62 (3) | 8.26 (3 1/4) | 0.64 (1/4) | 8.3 |
| 4 | PP SB | no heat; 38.1 (75) | MD | 7.62 (3) | 8.57 (3 3/8) | 0.95 (3/8) | 12.5 |

The FPO/PP web samples did not abrade during the course of the trial. The measured MD and CD stretch for the FPO/PP were equal. High compression forces were required to compress the rubber of the two rolls. It was found that an equal or greater MD stretch was caused by the outward flow of the displaced rubber. The heat added to the material was ~139.53° C. (283.4° F.). The rib knit material that was run through the rolls was abraded significantly by the bottom roll.

Experiment 2B

A polypropylene spunbond material containing small pinholes was run through the second set of rolls and experienced some abrasion. The abrasion was not as pronounced as that which was observed with the rib knit material. After being run through the rolls, the pinholes became more visible. Rubber to rubber contact between the two rolls led to some degradation of the roll surfaces. Small unintentional variations were observed in roll speed which could have contributed to roll degradation. Variations in roll speed may also have contributed to fiber degradation on the rib knit material and/or observed stretch in the machine direction.

Experiment 2C $CaCO_3$ filled metallocene catalyzed polyethylene film was run through the second set of rolls. There was apparent point stretching observed on the material itself.

Additional Test Conditions

WVTR Test 1

The water vapor transmission rate (WVTR) for the sample materials was calculated generally in accordance with the following test method in order to measure the breathability of the samples. The test procedures establish a means to determine the normalized rate of water vapor transmission through solid and porous films, nonwoven materials, and other materials while under steady state conditions. The material to be evaluated is sealed to the top of a cup of water and placed in a temperature-controlled environment. Evaporation of water in the cup results in a relatively higher vapor pressure inside the cup than the vapor pressure of the environment outside of the cup. This difference in vapor pressure causes the vapor inside the cup to flow through the test material to the outside of the cup. The rate of this flow is dependent upon the permeability of the test material sealed to the top of the cup. The difference between the beginning and ending cup weights is used to calculate the water vapor transmission rate.

In particular, circular samples measuring three inches in diameter were cut from each of the test materials and a control which was a piece of CELGARD© 2500 film from Hoechst Celanese Corporation. CELGARD© 2500 film is a microporous polypropylene film. The test dish was a 68-1 Vapometer cup distributed by Thwing-Albert Instrument Company of Philadelphia, Pa. One hundred milliliters of water were poured into each Vapometer cup and individual samples of the test materials and control material were placed across the open tops of the individual cups. A rubber gasket and metal ring (fitted to the cup) were placed over the sample and clamped using metal clamps. The sample test material and control material were exposed to the ambient atmosphere over a 6.5 centimeter diameter circle, having an exposed area of approximately 33.17 square centimeters. The cups were weighed. The cups were placed in an oven at about 38° C. (100° F.). The oven was a constant temperature oven with external air circulating through it to prevent water vapor accumulation inside. A suitable forced air oven is, for example, a Blue M Power-O-Matic 60 oven distributed by Blue M. Electric Company of Blue Ispeak, Ill. After 24 hours, the cups were removed from the oven and weighed again. The preliminary test water vapor transmission rate values were calculated with Equation (I) below:

APP MVT=(grams weight loss over 24 hours)×7571/24 expressed in $g/m^2/24$ hours  (I)

Under the predetermined set conditions of about 38° C. (100° F.) and ambient relative humidity, the WVTR for the CELGARD© 2500 control has been defined to be 5000 grams per square meter for 24 hours. Accordingly, the control sample was run with each test and the preliminary test values were corrected to set conditions using Equation (II) below:

WVTR=(Test WVTR/control WVTR)×(5000 $g/m^2/24$ hours)  (II)

An equivalent reference measurement of breathability would be the Moisture Vapor Transfer Rate (MVTR). Using this designation, the following experimental data was observed and calculated.

For the purpose of the test data, starting weight is designated by "ST WT", end weight is designated "END WT", Approximate moisture vapor transfer is designated by "APP MVT", and the correction factor is designated by "Corr Fact". The correction factor is calculated by dividing the expected transfer rate, that is 5000, by the observed transfer rate of the control. Test data was run on standard CELGARD 2500 samples, samples of calcium carbonate filled film not processed according to the inventive method, and samples of the calcium carbonate filled film processed according to the inventive method. The calculated MVTR data for each sample was then calculated by multiplying the average correction factor by the observed MVTR for each sample.

For each sample tested, the MVTR increased following use of the inventive stretching apparatus and method. The results of MVTR testing is reflected in the following Tables. Table 3 illustrates test results for Celgard standards. Table 4 illustrates test results for calcium carbonate filled film prior to being coursed through intermeshing filled and covered rolls. Table 5 illustrates test results for calcium carbonate filled film after being coursed through intermeshing filled and covered rolls.

TABLE 3

CELGARD 2500

| CUP# | ST WT. (g) | END WT. (g) | APP MVT | Corr Fact |
|---|---|---|---|---|
| B-7 | 229.15 | 212.07 | 5388.03 | 0.927 |
| B-12 | 224.39 | 207.2 | 5463.74 | 0.915 |
| B-18 | 229.55 | 212.9 | 5252.38 | 0.952 |
|  |  | Avg. CF | 5368.05 | 0.931 |

TABLE 4

| SAMPLE ID | Control CaCO3 filled w/metallocene cat. PE film | | |
|---|---|---|---|
| CUP # | ST. WT. (g) | END WT. (g) | APP MVT ($g/m^2/24$) |
| C-1 | 227.15 | 227.02 | 41.01 |
| C-5 | 229.06 | 228.89 | 53.63 |
| C-7 | 233.56 | 233.41 | 47.32 |
| C-8 | 233.21 | 232.96 | 78.86 |
| C-15 | 233.23 | 233.1 | 41.01 |

TABLE 4-continued

| SAMPLE ID | Control CaCO3 filled w/metallocene cat. PE film | | |
|---|---|---|---|
| CUP # | ST. WT. (g) | END WT. (g) | APP MVT (g/m$^2$/24) |
| D-21 | 230.09 | 229.97 | 37.86 |
| D-24 | 230.32 | 230.18 | 44.16 |
| D-25 | 230 | 229.81 | 59.94 |
| D-27 | 233.77 | 233.65 | 37.86 |
| D-28 | 229.26 | 229.06 | 63.09 |
| | | | AV MVTR |

TABLE 5

| SAMPLE ID | Control CaCo3 Filled w/metallocene catalyzed PE film w/Grooved Rolls | | | |
|---|---|---|---|---|
| CUP # | ST. WT. (g) | END WT. (g) | APP MVT (g/m$^2$/24) | MVTR |
| A-16 | 231.3 | 230.99 | 97.79 | 91.09 |
| A-20 | 233.04 | 232.65 | 123.03 | 114.59 |
| A-23 | 227.93 | 227.62 | 97.79 | 91.09 |
| A-25 | 231.96 | 231.68 | 88.33 | 82.27 |
| A-35 | 233.99 | 233.65 | 107.26 | 99.90 |
| A-17 | 233.95 | 233.61 | 107.26 | 99.90 |
| A-18 | 235.03 | 234.69 | 107.26 | 99.90 |
| A-29 | 233.95 | 233.66 | 91.48 | 85.21 |
| A-26 | 231.51 | 231.16 | 110.41 | 102.84 |
| A-19 | 231.33 | 231.04 | 91.48 | 85.21 |
| | | | AV MVTR | 95.20 |

WVTR Test 2

For a second set of WVTR tests, test conditions were repeated as in WVTR TEST 1. However, rather than utilize metal clamps to hold the rubber gasket and metal ring to the vapometer cups, a flange was secured to the vapometer cups utilizing screws. The following test data of Table 6 was then observed and calculated.

TABLE 6

| Sample ID Control (CaCO3) WVTR | Sample ID Grooved Rolls WVTR |
|---|---|
| 32.75 | 92.30 |
| 35.73 | 101.23 |
| 35.73 | 86.35 |
| 32.75 | 101.23 |
| 32.75 | 92.30 |
| 35.73 | 92.30 |
| 41.69 | 92.30 |
| 35.73 | 95.28 |
| 29.78 | 95.28 |
| 35.73 | 101.23 |
| AVG WVTR 34.84 | AVG WVTR 94.98 |

Experiment 3

Conditions

A set of intermeshing rolls was prepared as in Experiment 2. However, the neoprene covering on one of the rolls was removed completely. The troughs of this roll were clean and did not have any visible imperfections. The neoprene on the companion roll had some abrasion from the previous trial, but the neoprene was still generally smooth in appearance. The rolls were placed on a bonder in which both rolls were driven and the bottom roll was actuated as in Example 2. The materials which were coursed through the rolls included polypropylene spunbond having Expanded Hansen-Pennings bond pattern (PP SB EHP), rib knit of 20.35 gsm (0.6 osy), FPO/PP bicomponent, and CaCO$_3$ filled metallocene-catalyzed PE film.

The roll speed for both rolls was held between 37.60–38.1 cm/sec (74–75 fpm). The engagement was measured with 2812.28–4218.42 g/cm$^2$ (40–60 psi) from hydraulic pressure and by turning nip controls. These controls were pins located inside the bonder for fine tuning of the nip. The greater the pins were turned the more engagement was achieved. Tables 7 and 8 report the engagement and material codes, respectively. The "Distance" on the tables is the measurement between the mounting points for the pillow blocks on the bonder. This distance can be used to determine the engagement. At 5 turns and 2812.28 g/cm$^2$ (40 psi), the engagement was 0.79 centimeter (5/16 inch). The "Starting Width" refers to the width of the roll of material before entering the troughed rolls. The speed of the winder was increased so as to neck the sheet material down to its original width. The troughed roll speed was later set at 35.56 cm/sec (70 fpm), while the winder speed was set at 38.61 cm/sec (76 fpm).

In another test the troughed rolls were set at 20 fpm for the film to prevent snapping. The film was wound onto a roll by hand. An attempt was made to increase the speed of the troughed rolls. Abrasion of the top roll deterred attempts at higher speeds. Tears in the neoprene covering eventually resulted from load and the metal contact, eventually leading to material tie up on the rolls.

Significant increase in stretch was observed on material run through these modified rolls. While there was no observed abrasion caused by the modified rolls, light spots caused by point stretching were visible.

TABLE 7

| Roll Engagement | | |
|---|---|---|
| Anvil Pressure g/cm$^2$ (psi) | Turns | Distance cm (in) |
| 2812.28 (40) | 0 pt | 36.83 (14½) |
| 2812.28 (40) | 1 | 36.67 (14 7/16) |
| 2812.28 (40) | 3 | 36.20 (14¼) |
| 2812.28 (40) | 5 | 36.04 (14 3/16) |
| 3655.96 (52) | 5 | 35.96 (14 5/32) |
| 4218.42 (60) | 3 | 36.35 (14 5/16) |
| 4218.42 (60) | 4 | 36.20 (14¼) |
| 4218.42 (60) | 5 | 35.96 (14 5/32) |
| 4218.42 (60) | 6 | 36.04 (14 3/16) |

TABLE 8

| Material Codes | | | | | |
|---|---|---|---|---|---|
| CODE | Material | Starting Width cm (in) | Turns | Distance cm (in) | Stretch (%) |
| 1 | PP SB | 38.1 (15 inches) | 5 | 35.96 (14 5/32) | 46.67 |
| 2 | PP SB | 38.1 (15 inches) | 3 | 36.35 (14 5/16) | 16.67 |
| hand | PP SB | 38.1 (15 inches) | 4 | 36.20 (14¼) | 41.67 |
| 3 | FPO/PP | 29.85 (11.75 inches) | 4 | 36.20 (14¼) | 54.17 |
| 4 | FPO/PP | 29.85 (11.75 inches) | 6 | 36.04 (14 3/16) | 62.5 |
| 5 | film | — | 6 | 36.04 (14 3/16) | 1 pass |
| 5 | film | — | 6 | 36.04 (14 3/16) | 2 pass |
| 6 | Rib knit | 40.64 (16 inches) | 6 | 36.04 (14 3/16) | 33.33 |

The filled and covered rolls of Example 3 produced material that was softer to the touch and that extended with a decrease in tensions and without apparent loss of integrity. The FPO/PP material experienced the largest overall increase in stretch. The rolls extended PP SB without destroying the material. Trials with one of the rolls stripped of rubber allowed greater intermesh than prior examples, but no MD stretch. The degree of intermesh had an effect on the stretch, despite one of the compressed surfaces being covered.

In summary, the inventive apparatus and method offers a means for achieving film breathability as well as nonwoven material facing extensibility. The inventive method offers repeatable, zoned areas of stretch in different directions, repeatable, zoned areas of different degrees of stretch, and repeatable, discrete areas of stretching within unstretched areas. The method also offers CD stretching of films and more delicate webs with less variability in stretch. Furthermore the aspects of the inventive method can be arranged sequentially, axially, radially, or in a combination providing zoned areas of CD, MD, or combination stretching.

While the invention has been described in detail with particular reference to a preferred embodiment thereof, it should be understood that many modifications, additions, and deletions can be made thereto without departure from the spirit and the scope of the invention as set forth in the following claims.

What is claimed is:

1. A method for stretching a polymeric sheet material, comprising coursing a polymeric sheet material through a deformable nip, the nip being formed between two rotating stretch surfaces having intermeshing peaks and troughs, the surfaces of the peaks and troughs being covered and filled with a deformable material, and contemporaneously pressing the stretch surfaces together while rotating the stretch surfaces such that as the polymeric sheet material travels through the nip, the nip deforms from an initial flat formation into a convoluted formation, whereby the polymeric sheet material is stretched incrementally.

2. The method of claim 1 wherein the nip is formed between two rolls.

3. The method of claim 1 wherein the nip is formed between two endless belts.

4. The method of claim 1 further including the step of bonding a second polymeric sheet material to the initial sheet material.

5. The method of claim 1 wherein a flexible polyolefin/polypropylene bicomponent spunbond fiber sheet is stretched by the method of claim 1.

6. A method for stretching sheet material in the cross-machine direction comprising:

a) providing a first stretch surface for stretching polymeric sheet material, said stretch surface including peaks and troughs, said peaks and troughs being filled and covered with a deformable material, said first stretch surface being capable of rotation;

b) providing a second stretch surface for stretching polymeric sheet material, said second stretch surface including peaks and troughs, said peaks and troughs being filled and covered with a deformable material, said stretch surface being positioned in parallel axial alignment with said first stretch surface such that the peaks of said first stretch surface are aligned with the troughs of said second stretch surface, said second surface being moveable with respect to said first stretch surface and being capable of rotation;

c) pressing said second stretch surface into said first stretch surface;

d) rotating at least one of said stretch surfaces; and e) coursing an initial sheet material through said first and second stretch surfaces.

7. The method of claim 6 further including the step of bonding a second sheet material to the initial sheet material.

* * * * *